United States Patent
Lemons

(10) Patent No.: US 7,671,266 B2
(45) Date of Patent: Mar. 2, 2010

(54) SYSTEM AND METHOD FOR SPEECH THERAPY

(75) Inventor: Kenneth R. Lemons, Indianapolis, IN (US)

(73) Assignee: Master Key, LLC, Indianapolis, IN (US)

( * ) Notice: Subject to any disclaimer, the term of this patent is extended or adjusted under 35 U.S.C. 154(b) by 110 days.

(21) Appl. No.: 12/148,589

(22) Filed: Apr. 21, 2008

(65) Prior Publication Data

US 2008/0271590 A1 Nov. 6, 2008

Related U.S. Application Data

(60) Provisional application No. 60/912,966, filed on Apr. 20, 2007, provisional application No. 60/912,959, filed on Apr. 20, 2007, provisional application No. 60/912,955, filed on Apr. 20, 2007.

(51) Int. Cl.
*A63H 5/00* (2006.01)
*G04B 13/00* (2006.01)

(52) U.S. Cl. .............. 84/609; 84/603; 84/616; 84/622; 84/649; 84/654; 84/659

(58) Field of Classification Search .......... None
See application file for complete search history.

(56) References Cited

U.S. PATENT DOCUMENTS

| | | | |
|---|---|---|---|
| 4,526,168 A | 7/1985 | Hassler et al. | |
| 4,887,507 A | 12/1989 | Shaw | |
| 4,907,573 A | 3/1990 | Nagasaki | |
| 5,207,214 A | 5/1993 | Romano | |
| 5,370,539 A | 12/1994 | Dillard | |
| 5,415,071 A | 5/1995 | Davies | |
| 5,741,990 A | 4/1998 | Davies | |
| 6,031,172 A | 2/2000 | Papadopoulos | |
| 6,111,755 A | 8/2000 | Park | |

(Continued)

FOREIGN PATENT DOCUMENTS

EP 1354561 A1 10/2003

(Continued)

OTHER PUBLICATIONS

"Time-line of the Music Animation Machine (and related experiments)", Music Animation Machine: History, htp://www.musanim.com/mam/mamhist.htm, pp. 1-5, p. 1, pp. 1-2, pp. 1-2 & p. 1, printed Aug. 30, 2007.

(Continued)

*Primary Examiner*—Marlon T Fletcher
(74) *Attorney, Agent, or Firm*—Woodard, Emhardt, Moriarty, McNett & Henry LLP

(57) ABSTRACT

The present disclosure relates to speech therapy and voice training methods. A system is provided which utilizes tonal and rhythm visualization components to allow a person to "see" their words as they attempt to improve or regain their ability to speak clearly. The system is also applicable to vocal music instruction and allows students improve their singing abilities by responding to visual feedback which incorporates both color and shape. The system may comprise a step-by-step instruction method, live performance abilities, and recording and playback features. Certain embodiments incorporate statistical analysis of student progress, remote access for teacher consultation, and video games for enhancing student interest.

1 Claim, 19 Drawing Sheets
(13 of 19 Drawing Sheet(s) Filed in Color)

U.S. PATENT DOCUMENTS

| | | | |
|---|---|---|---|
| 6,137,041 | A | 10/2000 | Nakano |
| 6,201,769 | B1 | 3/2001 | Lewis |
| 6,245,981 | B1 | 6/2001 | Smith |
| 6,392,131 | B2 | 5/2002 | Boyer |
| 6,411,289 | B1 | 6/2002 | Zimmerman |
| 6,448,487 | B1 | 9/2002 | Smith |
| 6,841,724 | B2 | 1/2005 | George |
| 6,930,235 | B2 | 8/2005 | Sandborn et al. |
| 7,030,307 | B2 | 4/2006 | Wedel |
| 7,096,154 | B1 | 8/2006 | Andrade-Cetto |
| 7,153,139 | B2 | 12/2006 | Wen et al. |
| 7,182,601 | B2 | 2/2007 | Donnan |
| 2005/0190199 | A1 | 9/2005 | Brown et al. |
| 2005/0241465 | A1 | 11/2005 | Goto |

FOREIGN PATENT DOCUMENTS

| | | |
|---|---|---|
| JP | 0349686 A1 | 1/1990 |
| JP | 05-232856 | 9/1993 |
| JP | 2004-226556 A | 8/2004 |
| KR | 10-2006-0110988 | 10/2006 |

OTHER PUBLICATIONS

Ashton, Anthony, "Harmonograph: A Visual Guide to the Mathematics of Music," ISBN 0-8027-1409-9, Walker Publishing Company, 2003, pp. 1-58.

Bourke, Paul, "Harmonograph," Aug. 1999, http://local.wasp.uwa.edu.au/~pbourke/suraces_curves/harmonograph/, pp. 1-6, printed Aug. 30, 2007.

Dunne, Gabriel, "Color/Shape/Sound Ratio & Symmetry Calculator," Quilime.com—Symmetry Calculator, https://www.quilime.com/content/colorcalc/, pp. 1-6, printed Jul. 3, 2007.

Patent Application Search report mailed on Aug. 1, 2008 for PCT/US2008/59126.

Patent Application Search Report mailed on Aug. 14, 2008 for PCT/US2008/04989.

Patent Application Search Report mailed on Aug. 18, 2008 for PCT/US2008/005069.

Patent Application Search Report mailed on Aug. 18, 2008 for PCT/US2008/005073.

Patent Application Search Report mailed on Aug. 18, 2008 for PCT/US2008/005126.

Patent Application Search Report mailed on Aug. 21, 2008 for PCT/US2008/005076.

Patent Application Search Report mailed on Aug. 27, 2008 for PCT/US2008/005075.

Patent Application Search Report mailed on Aug. 28, 2008 for PCT/US2008/005077.

Patent Application Search Report mailed on Jul. 31, 2008 for PCT/US2008/005070.

Patent Application Search Report mailed on Sep. 18, 2008 for PCT/US2008/005072.

Patent Application Search Report mailed on Sep. 18, 2008 for PCT/US2008/005124.

Patent Application Search Report mailed on Sep. 24, 2008 for PCT/US2008/005125.

Patent Application Search Report mailed on Sep. 29, 2008 for PCT/US2008/005074.

Rabiner, Huang "Fundamentals of Speech Recognition," PTR Prentice-Hall, Inc., 1993, ISBN 0-13-285826-6, pp. 21-31, 42-68; Fig. 2.17, 2.32.

SYSTEM AND METHOD FOR SPEECH THERAPY

CROSS-REFERENCE TO RELATED APPLICATIONS

The present application claims the benefit of U.S. Provisional Patent Application Ser. No. 60/912,966, filed Apr. 20, 2007, entitled "Method and Apparatus for Speech Therapy Using Visualization Components", U.S. Provisional Patent Application Ser. No. 60/912,959 filed Apr. 20, 2007 entitled "Method and Apparatus for Teaching the Deaf to Speak By Using Visualization Components", and U.S. Provisional Patent Application Ser. No. 60/912,955, filed Apr. 20, 2007, entitled "Voice Training for Singers Using Visualization Components." This application also relates to U.S. Provisional Patent Application Ser. No. 60/830,386 filed Jul. 12, 2006 entitled "Apparatus and Method for Visualizing Musical Notation", U.S. Utility patent application Ser. No. 11/827,264 filed Jul. 11, 2007 entitled "Apparatus and Method for Visualizing Music and Other Sounds", U.S. Provisional Patent Application Ser. No. 60/921,578, filed Apr. 3, 2007, entitled "Device and Method for Visualizing Musical Rhythmic Structures", and U.S. Utility patent application Ser. No. 12/023,375 filed Jan. 31, 2008 entitled "Device and Method for Visualizing Musical Rhythmic Structures". All of these applications are hereby incorporated by reference in their entirety.

TECHNICAL FIELD OF THE DISCLOSURE

The present disclosure relates generally to speech therapy and, more specifically, to a system and method for speech therapy and voice training using analysis of tonal and rhythmic structures.

BACKGROUND OF THE DISCLOSURE

Stroke victims or others who have lost the ability to speak clearly through accident or surgery, for example, often undergo long hours of speech therapy that requires the patient to match or imitate their spoken words with a word or phrase that they hear. Because speech sounds different to the person who is speaking than it does to others who are hearing that person, it is frequently difficult for someone to accurately hear what they are saying when attempting to imitate words and phrases. Students learning to sing also have trouble mastering proper vocal techniques due to this difference in sound perception between the student and teacher. People who are deaf or have lost their hearing have an even more difficult time in either learning to speak or to continue to speak clearly enough to be understood. Without the ability to hear what is being spoken, an individual has no way to tell what their words sound like, and hence no way to tell how to speak more clearly, or even how to speak at all. Methods are needed which improve the efficiency and quality of speech therapy and vocal instruction.

SUMMARY OF THE INVENTION

Accordingly, in one aspect, a speech therapy system is disclosed, comprising: a microphone, a processing device, and a display; wherein said processing device executes computer readable code to create a first visual representation of a spoken word sensed by said microphone for output on said display; and wherein said first visual representation is generated according to a method comprising the steps of: (a) labeling the perimeter of a circle with a plurality of labels corresponding to a plurality of equally spaced frequency intervals in an octave, such that moving clockwise or counter-clockwise between adjacent ones of said labels represents a first frequency interval; (b) identifying an occurrence of a first frequency within the spoken word; (c) identifying an occurrence of a second frequency within the spoken word; (d) identifying a first label corresponding to the first frequency; (e) identifying a second label corresponding to the second frequency; (f) creating a first line connecting the first label and the second label.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
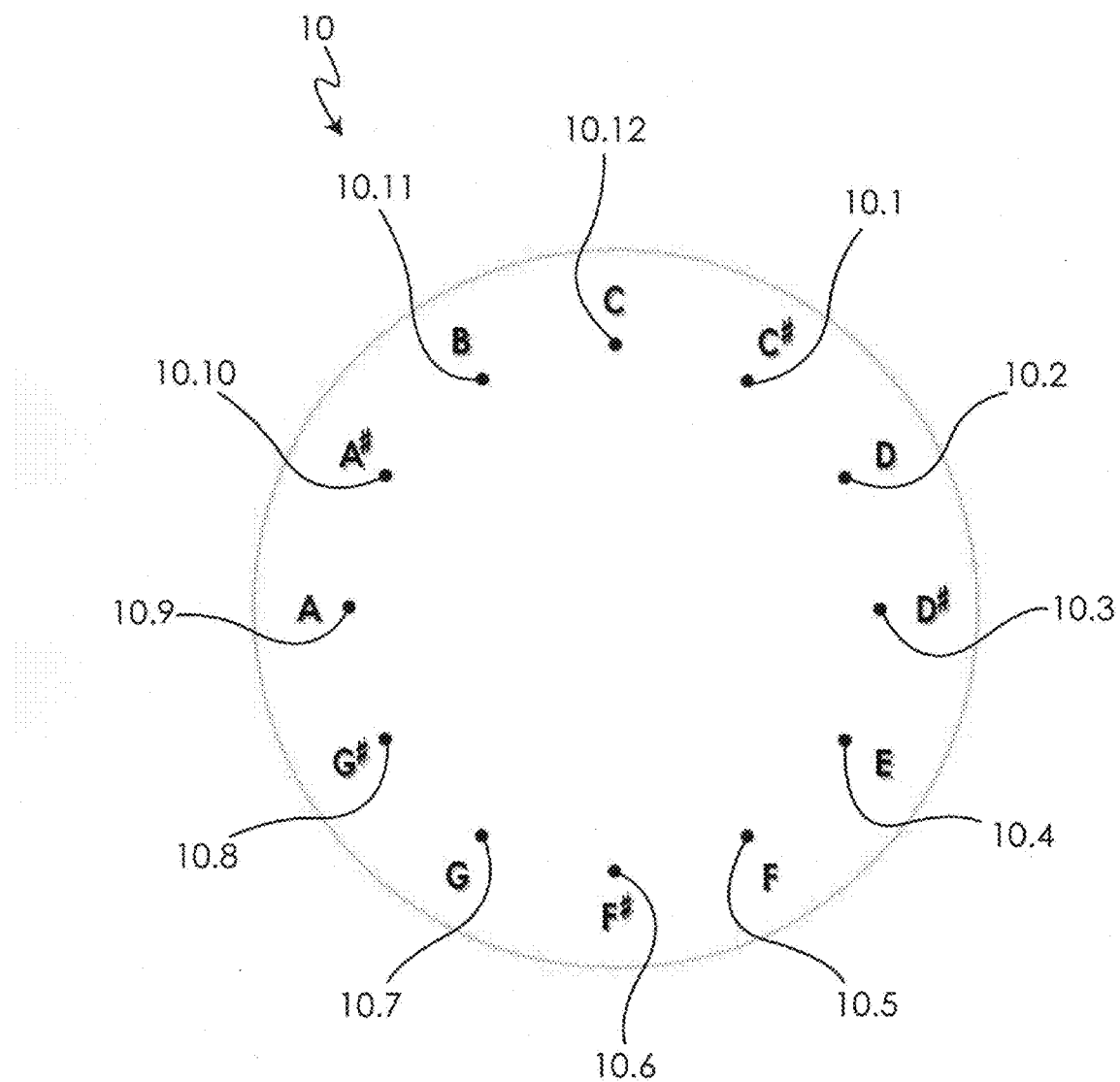
FIG. 1 is a diagram of a twelve-tone circle according to one embodiment.

For the purposes of promoting an understanding of the principles of the invention, reference will now be made to the embodiment illustrated in the drawings and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

Before describing the system and method for speech therapy, a summary of the above-referenced music tonal and rhythmic visualization methods will be presented. The tonal visualization methods are described in U.S. patent application Ser. No. 11/827,264 filed Jul. 11, 2007 entitled "Apparatus and Method for Visualizing Music and Other Sounds" which is hereby incorporated by reference in its entirety.

There are three traditional scales or 'patterns' of musical tone that have developed over the centuries. These three scales, each made up of seven notes, have become the foundation for virtually all musical education in the modern world. There are, of course, other scales, and it is possible to create any arbitrary pattern of notes that one may desire; but the vast majority of musical sound can still be traced back to these three primary scales.

Each of the three main scales is a lopsided conglomeration of seven intervals:

| | |
|---|---|
| Major scale: | 2 steps, 2 steps, 1 step, 2 steps, 2 steps, 2 steps, 1 step |
| Harmonic Minor Scale: | 2, 1, 2, 2, 1, 3, 1 |
| Melodic Minor Scale: | 2, 1, 2, 2, 2, 2, 1 |

Unfortunately, our traditional musical notation system has also been based upon the use of seven letters (or note names) to correspond with the seven notes of the scale: A, B, C, D, E, F and G. The problem is that, depending on which of the three scales one is using, there are actually twelve possible tones to choose from in the 'pool' of notes used by the three scales. Because of this discrepancy, the traditional system of musical notation has been inherently lopsided at its root.

With a circle of twelve tones and only seven note names, there are (of course) five missing note names. To compensate, the traditional system of music notation uses a somewhat arbitrary system of 'sharps' (#'s) and 'flats' (b's) to cover the remaining five tones so that a single notation system can be used to encompass all three scales. For example, certain key signatures will have seven 'pure letter' tones (like 'A') in addition to sharp or flat tones (like $C^\#$ or $G^b$), depending on the key signature. This leads to a complex system of reading and writing notes on a staff, where one has to mentally juggle a key signature with various accidentals (sharps and flats) that are then added one note at a time. The result is that the seven-note scale, which is a lopsided entity, is presented as a straight line on the traditional musical notation staff. On the other hand, truly symmetrical patterns (such as the chromatic scale) are represented in a lopsided manner on the traditional musical staff. All of this inefficiency stems from the inherent flaw of the traditional written system being based upon the seven note scales instead of the twelve-tone circle.

To overcome this inefficiency, a set of mathematically based, color-coded MASTER KEY™ diagrams is presented to better explain the theory and structures of music using geometric form and the color spectrum. As shown in FIG. 1, the twelve tone circle 10 is the template upon which all of the other diagrams are built. Twelve points 10.1-10.12 are geometrically placed in equal intervals around the perimeter of the circle 10 in the manner of a clock; twelve points, each thirty degrees apart. Each of the points 10.1-10.12 on the circle 10 represents one of the twelve pitches. The names of the various pitches can then be plotted around the circle 10. It will be appreciated that in traditional musical notation there are more than one name for each pitch (e.g., $A^\#$ is the same as $B^b$), which causes inefficiency and confusion since each note can be 'spelled' in two different ways. In the illustrated embodiment, the circle 10 has retained these traditional labels, although the present disclosure comprehends that alternative labels can be used, such as the letters A-L, or numbers 1-12. Furthermore, the circle 10 of FIG. 1 uses the sharp notes as labels; however, it will be understood that some or all of these sharp notes can be labeled with their flat equivalents and that some of the non-sharp and non-flat notes can be labeled with the sharp or flat equivalents.

Figure 2:
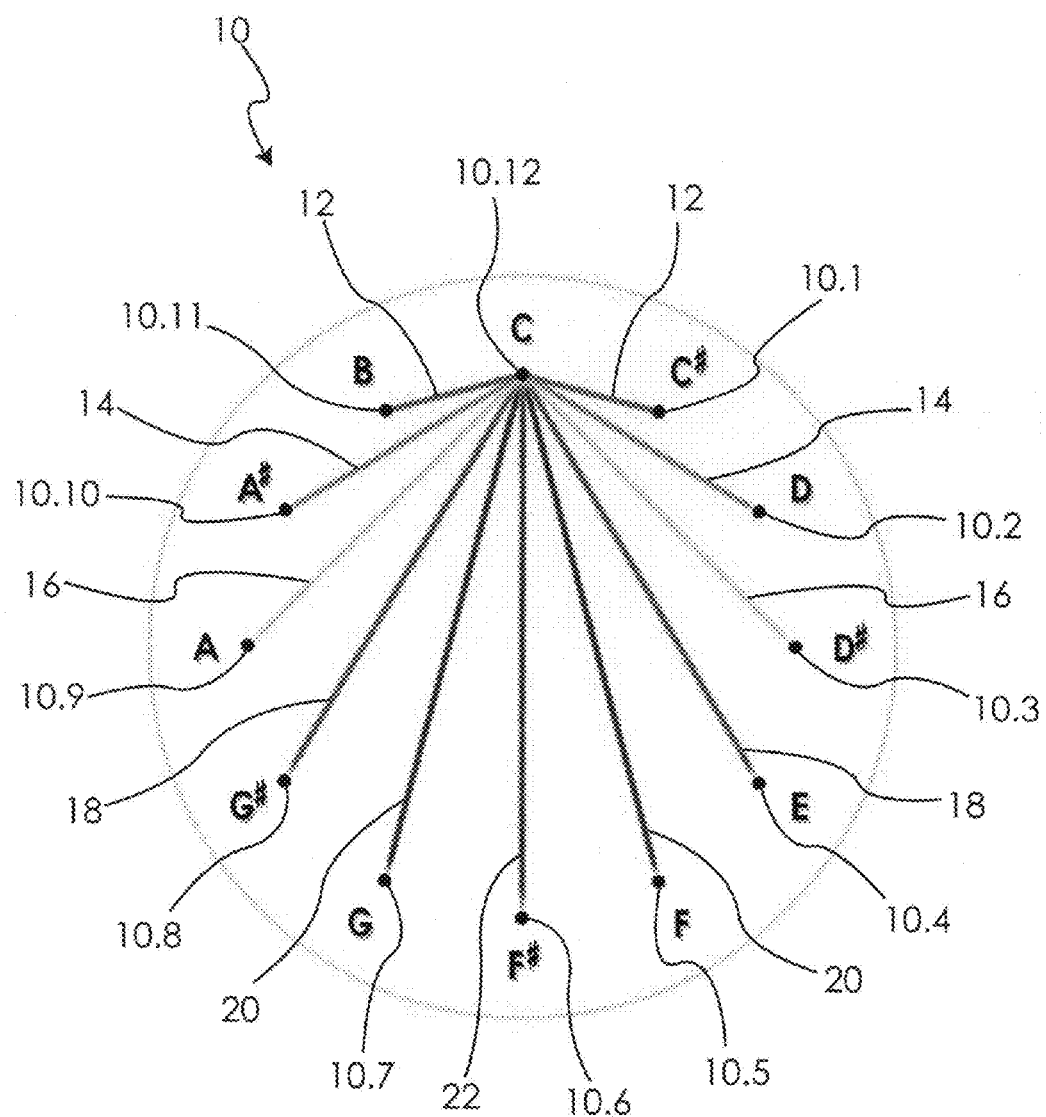
FIG. 2 is a diagram of a twelve-tone circle showing the six intervals.

The next 'generation' of the MASTER KEY™ diagrams involves thinking in terms of two note 'intervals.' The Interval diagram, shown in FIG. 2, is the second of the MASTER KEY™ diagrams, and is formed by connecting the top point 10.12 of the twelve-tone circle 10 to every other point 10.1-10.11. The ensuing lines—their relative length and color—represent the various 'intervals.' It shall be understood that while eleven intervals are illustrated in FIG. 2, there are actually only six basic intervals to consider. This is because any interval larger than the tri-tone (displayed in purple in FIG. 2) has a 'mirror' interval on the opposite side of the circle. For example, the whole-step interval between C (point 10.12) and D (point 10.2) is equal to that between C (point 10.12) and $A^\#$ (point 10.10).

Another important aspect of the MASTER KEY™ diagrams is the use of color. Because there are six basic music intervals, the six basic colors of the rainbow can be used to provide another way to comprehend the basic structures of music. In a preferred embodiment, the interval line 12 for a half step is colored red, the interval line 14 for a whole step is colored orange, the interval line 16 for a minor third is colored yellow, the interval line 18 for a major third is colored green, the interval line 20 for a perfect fourth is colored blue, and the interval line 22 for a tri-tone is colored purple. In other embodiments, different color schemes may be employed. What is desirable is that there is a gradated color spectrum assigned to the intervals so that they may be distinguished from one another by the use of color, which the human eye can detect and process very quickly.

Figure 3:
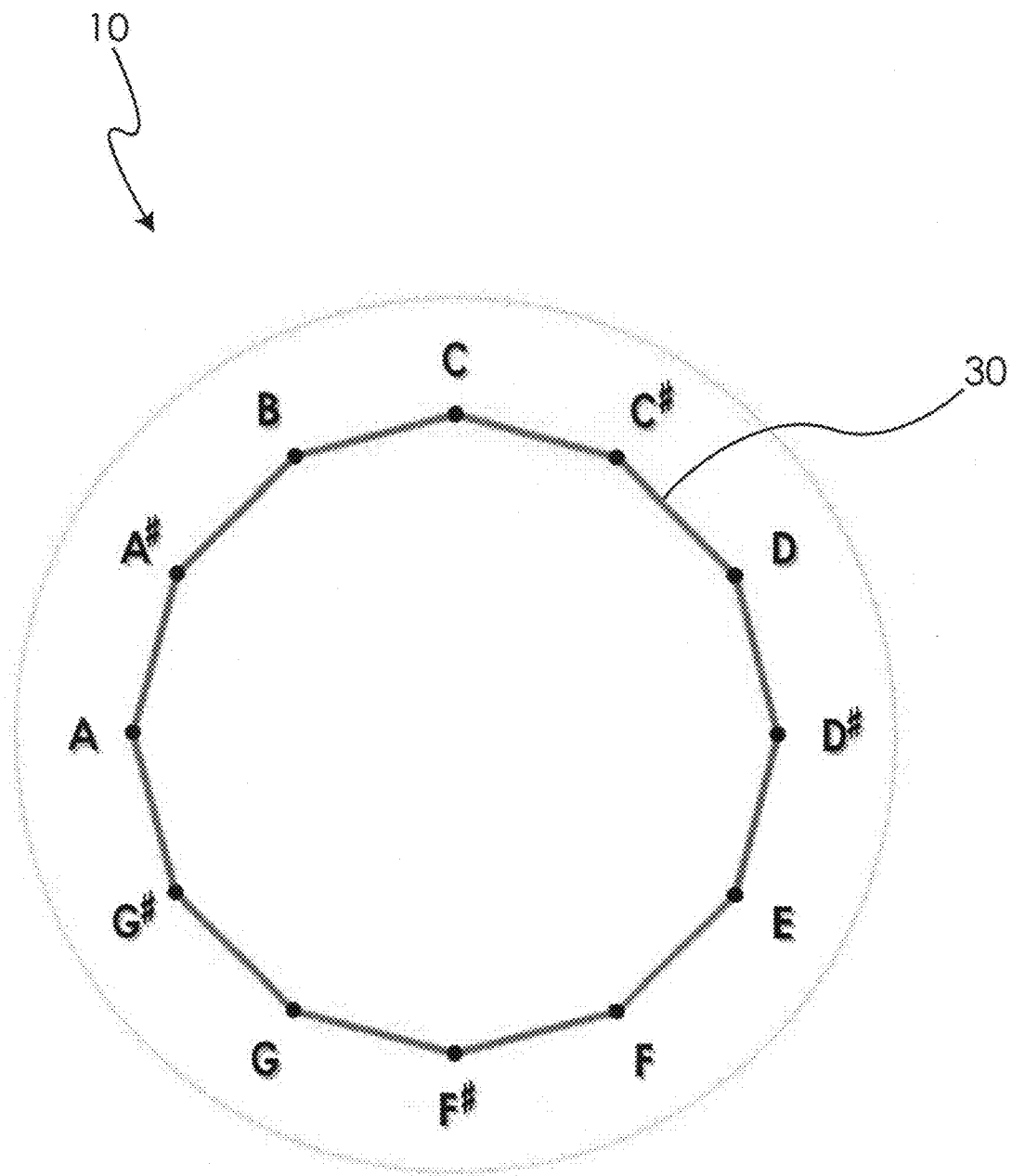
FIG. 3 is a diagram of a twelve-tone circle showing the chromatic scale.
Figure 4:
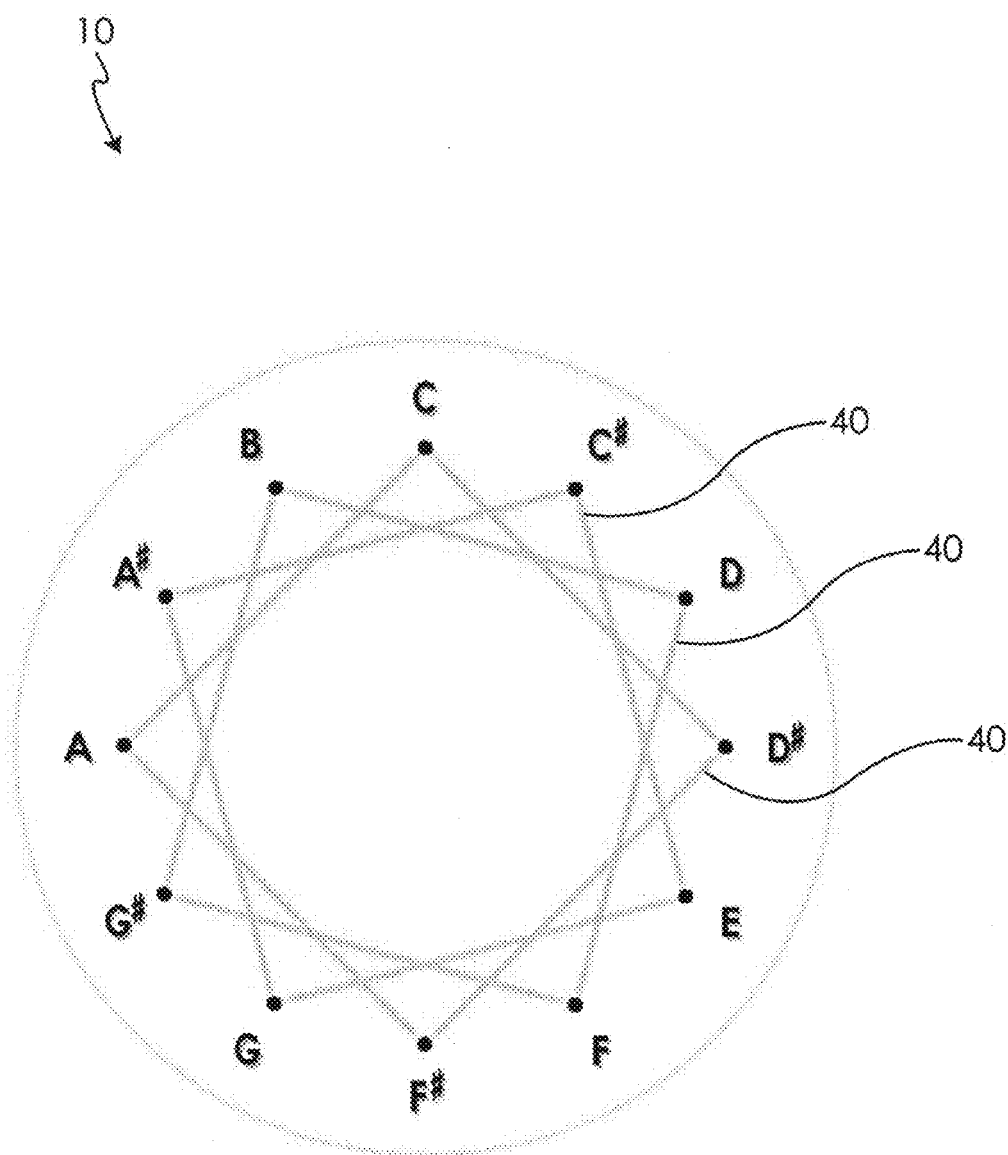
FIG. 4 is a diagram of a twelve-tone circle showing the first through third diminished scales.
Figure 5:
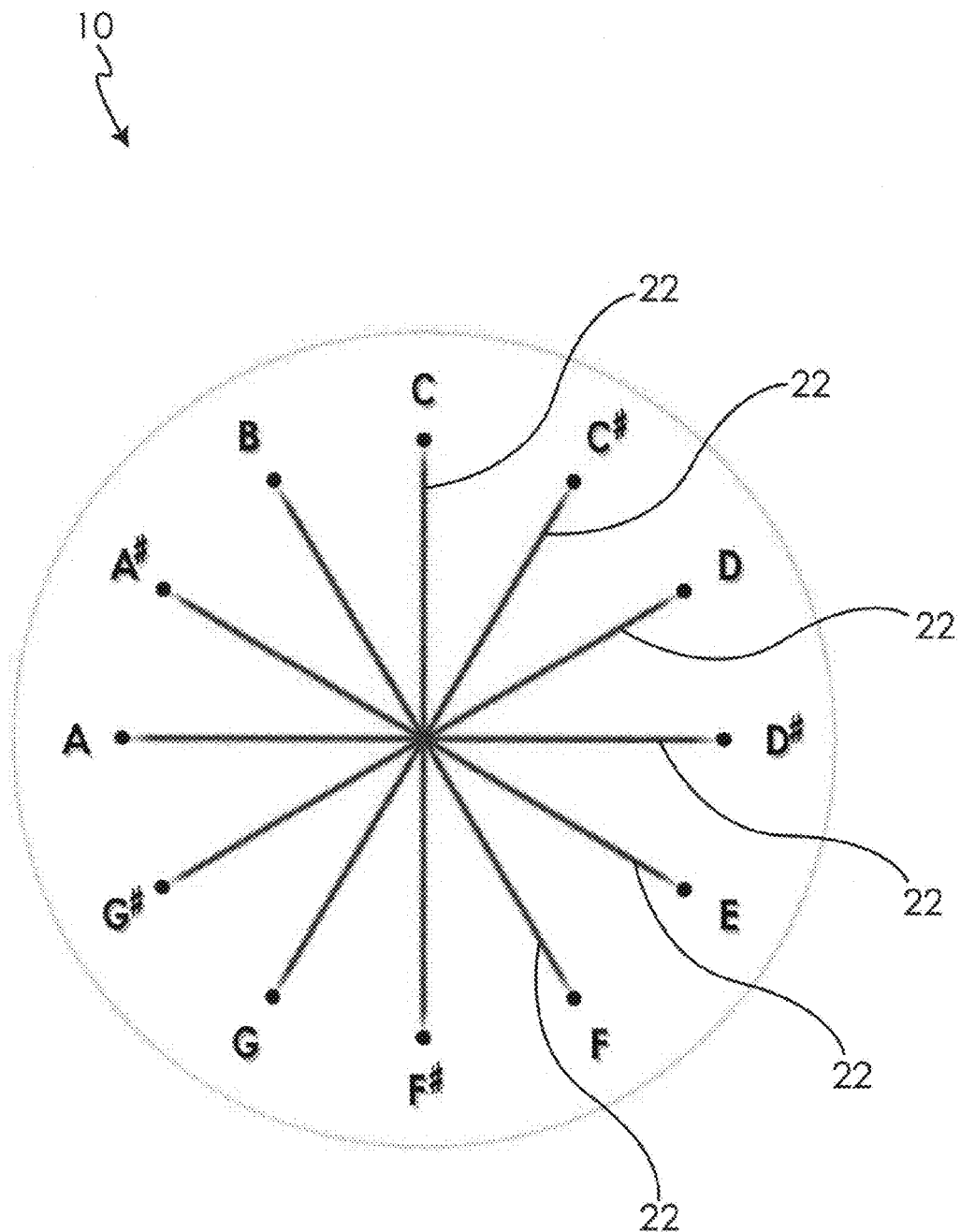
FIG. 5 is a diagram of a twelve-tone circle showing all six tri-tones.

The next group of MASTER KEY™ diagrams pertains to extending the various intervals 12-22 to their completion around the twelve-tone circle 10. This concept is illustrated in FIG. 3, which is the diagram of the chromatic scale. In these diagrams, each interval is the same color since all of the intervals are equal (in this case, a half-step). In the larger intervals, only a subset of the available tones is used to complete one trip around the circle. For example, the minor-third scale, which gives the sound of a diminished scale and forms the shape of a square 40, requires three transposed scales to fill all of the available tones, as illustrated in FIG. 4. The largest interval, the tri-tone, actually remains a two-note shape 22, with six intervals needed to complete the circle, as shown in FIG. 5.

The next generation of MASTER KEY™ diagrams is based upon musical shapes that are built with three notes. In musical terms, three note structures are referred to as triads.

Figure 6:
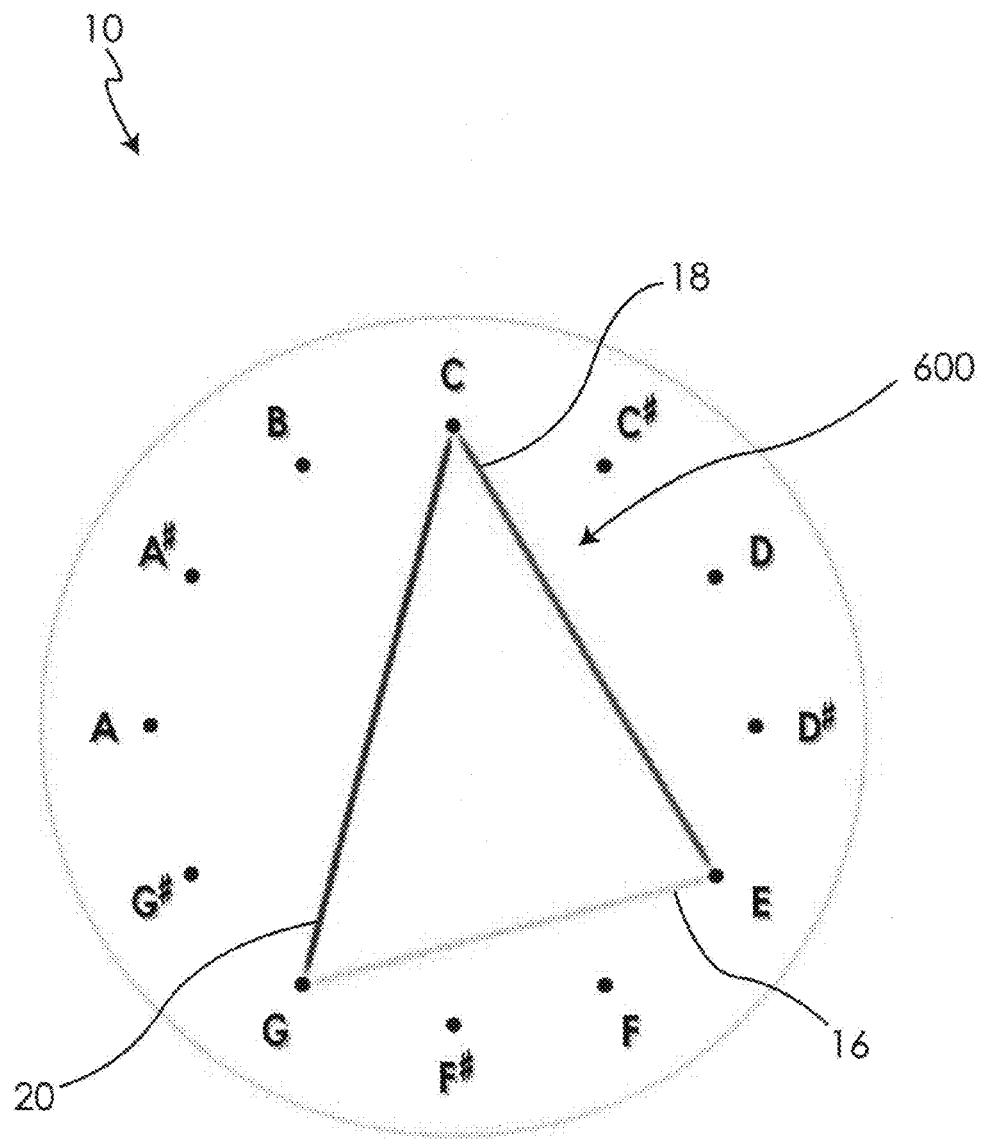
FIG. 6 is a diagram of a twelve-tone circle showing a major triad.

There are only four triads in all of diatonic music, and they have the respective names of major, minor, diminished, and augmented. These four, three-note shapes are represented in the MASTER KEY™ diagrams as different sized triangles, each built with various color coded intervals. As shown in FIG. 6, for example, the major triad 600 is built by stacking (in a clockwise direction) a major third 18, a minor third 16, and then a perfect fourth 20. This results in a triangle with three sides in the respective colors of green, yellow, and blue, following the assigned color for each interval in the triad. The diagrams for the remaining triads (minor, diminished, and augmented) follow a similar approach.

Figure 7:
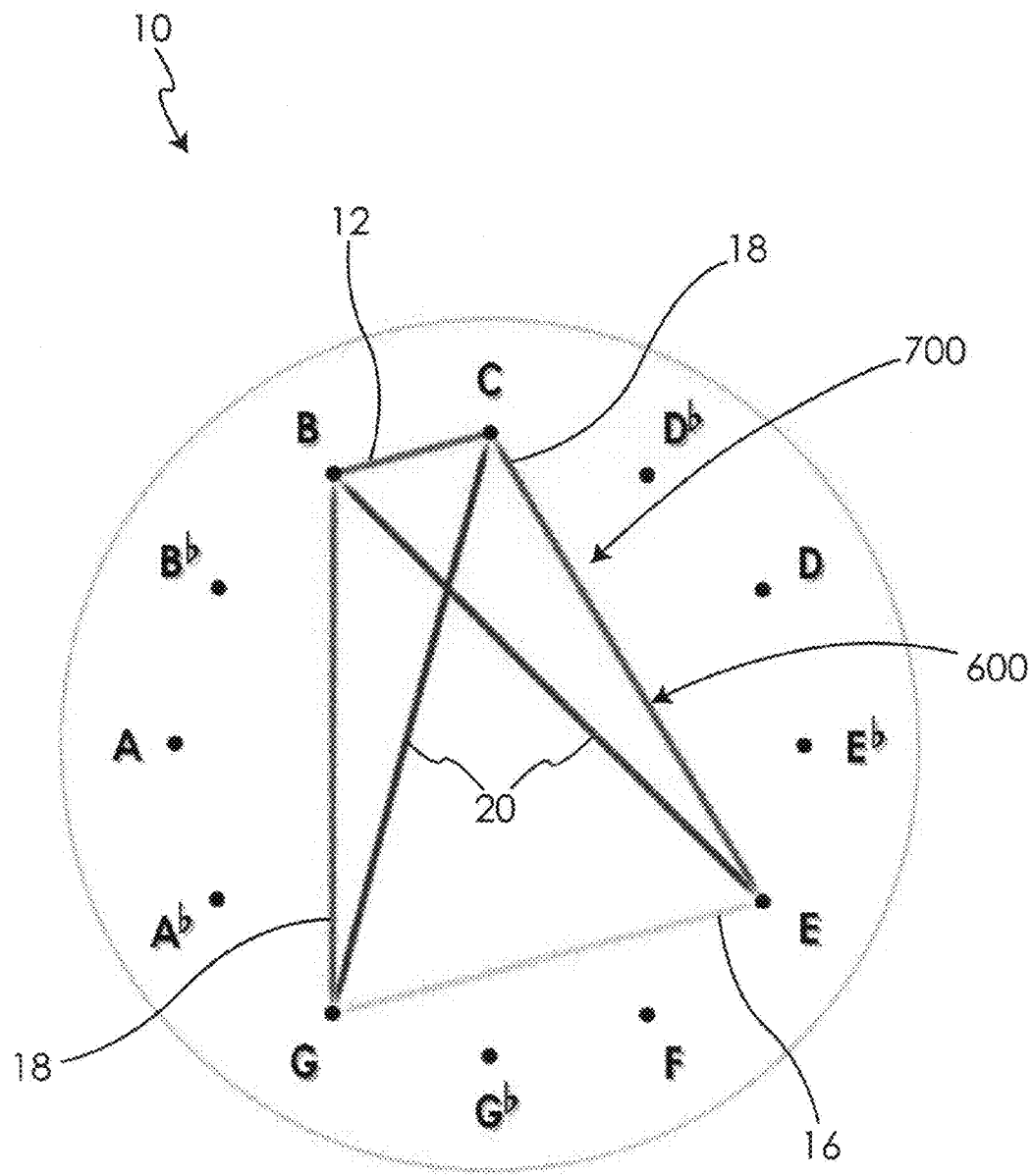
FIG. 7 is a diagram of a twelve-tone circle showing a major seventh chord.

The next group of MASTER KEY™ diagrams are developed from four notes at a time. Four note chords, in music, are referred to as seventh chords, and there are nine types of seventh chords. FIG. 7 shows the diagram of the first seventh chord, the major seventh chord 700, which is created by stacking the following intervals (as always, in a clockwise manner): a major third, a minor third 16, another major third 18, and a half step 12. The above description illustrates the outer shell of the major seventh chord 700 (a four-sided polyhedron); however, general observation will quickly reveal a new pair of 'internal' intervals, which haven't been seen in previous diagrams (in this instance, two perfect fourths 20). The eight remaining types of seventh chords can likewise be mapped on the MASTER KEY™ circle using this method.

Figure 8:
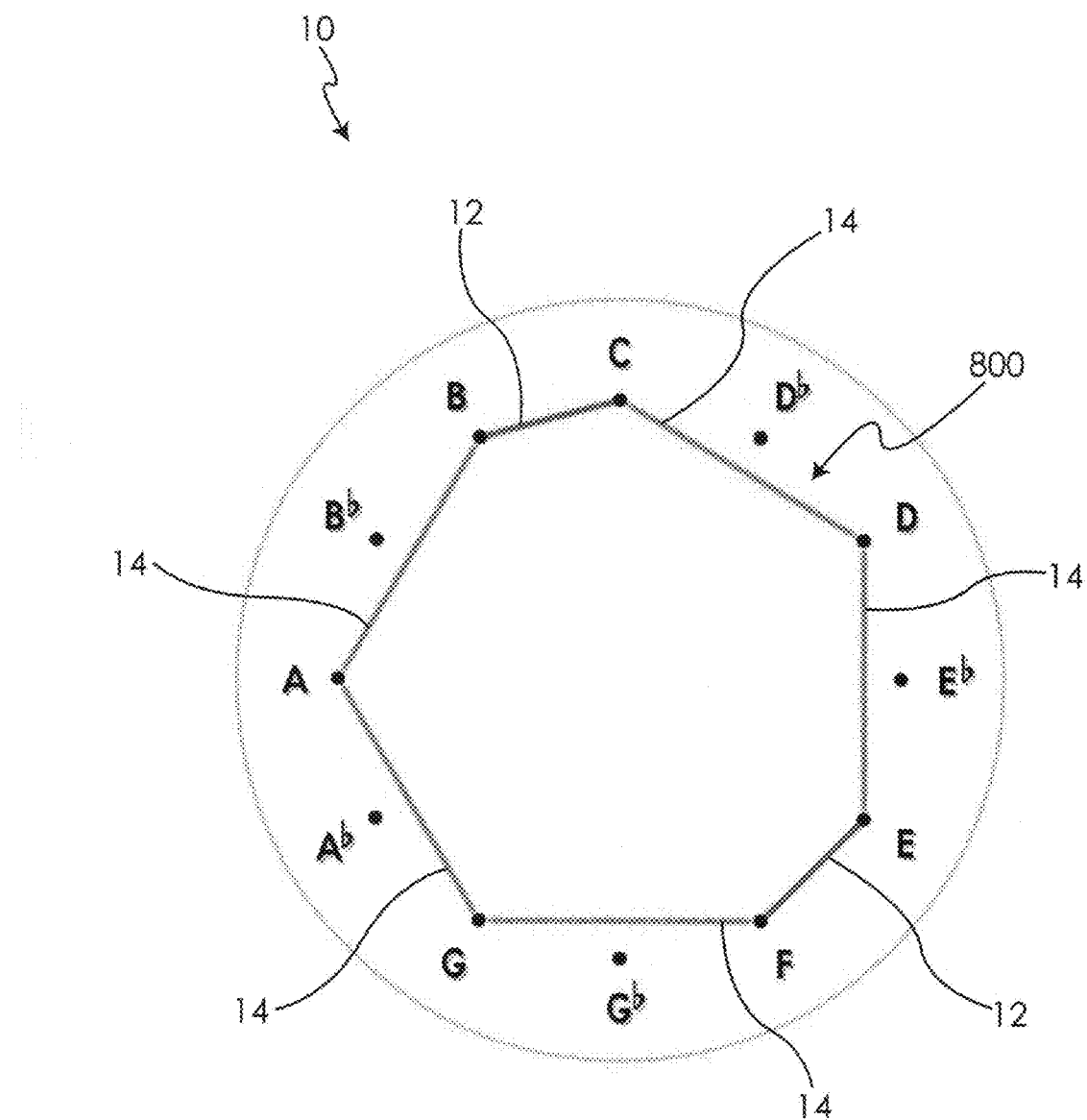
FIG. 8 is a diagram of a twelve-tone circle showing a major scale.

Every musical structure that has been presented thus far in the MASTER KEY™ system, aside from the six basic intervals, has come directly out of three main scales. Again, the three main scales are as follows: the Major Scale, the Harmonic-Minor Scale, and the Melodic-Minor Scale. The major scale is the most common of the three main scales and is heard virtually every time music is played or listened to in the western world. As shown in FIG. 8 and indicated generally at 800, the MASTER KEY™ diagram clearly shows the major scale's 800 makeup and its naturally lopsided nature. Starting at the top of the circle 10, one travels clockwise around the scale's outer shell. The following pattern of intervals is then encountered: whole step 14, whole step 14, half step 12, whole step 14, whole step 14, whole step 14, half step 12. The most important aspect of each scale diagram is, without a doubt, the diagram's outer 'shell.' Therefore, the various internal intervals in the scale's interior are not shown. Since we started at point 10.12, or C, the scale 800 is the C major scale. Other major scales may be created by starting at one of the other notes on the twelve-tone circle 10. This same method can be used to create diagrams for the harmonic minor and melodic minor scales as well.

Figure 9:
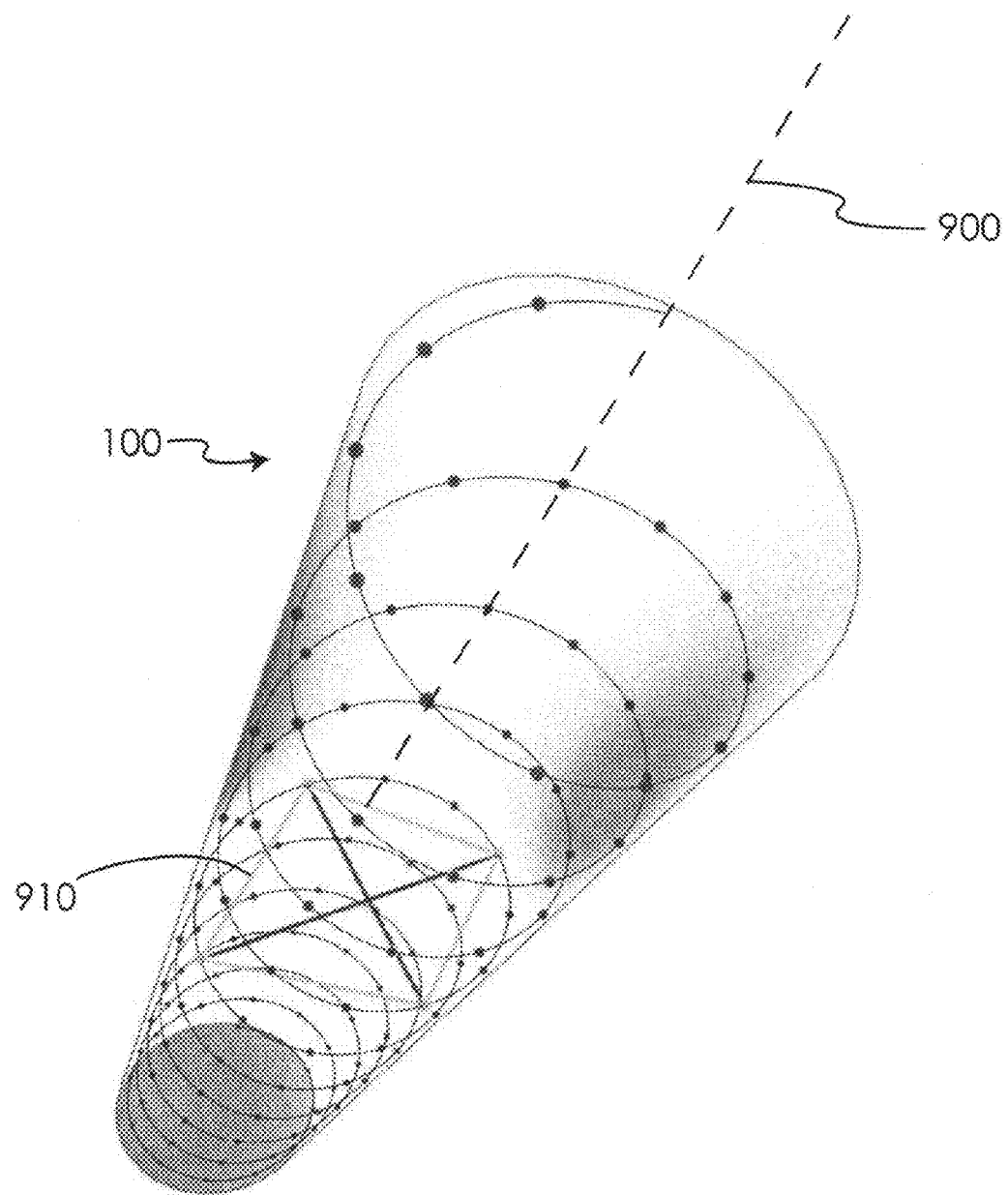
FIGS. 9-10 are diagrams of a helix showing a B diminished seventh chord.
Figure 10:
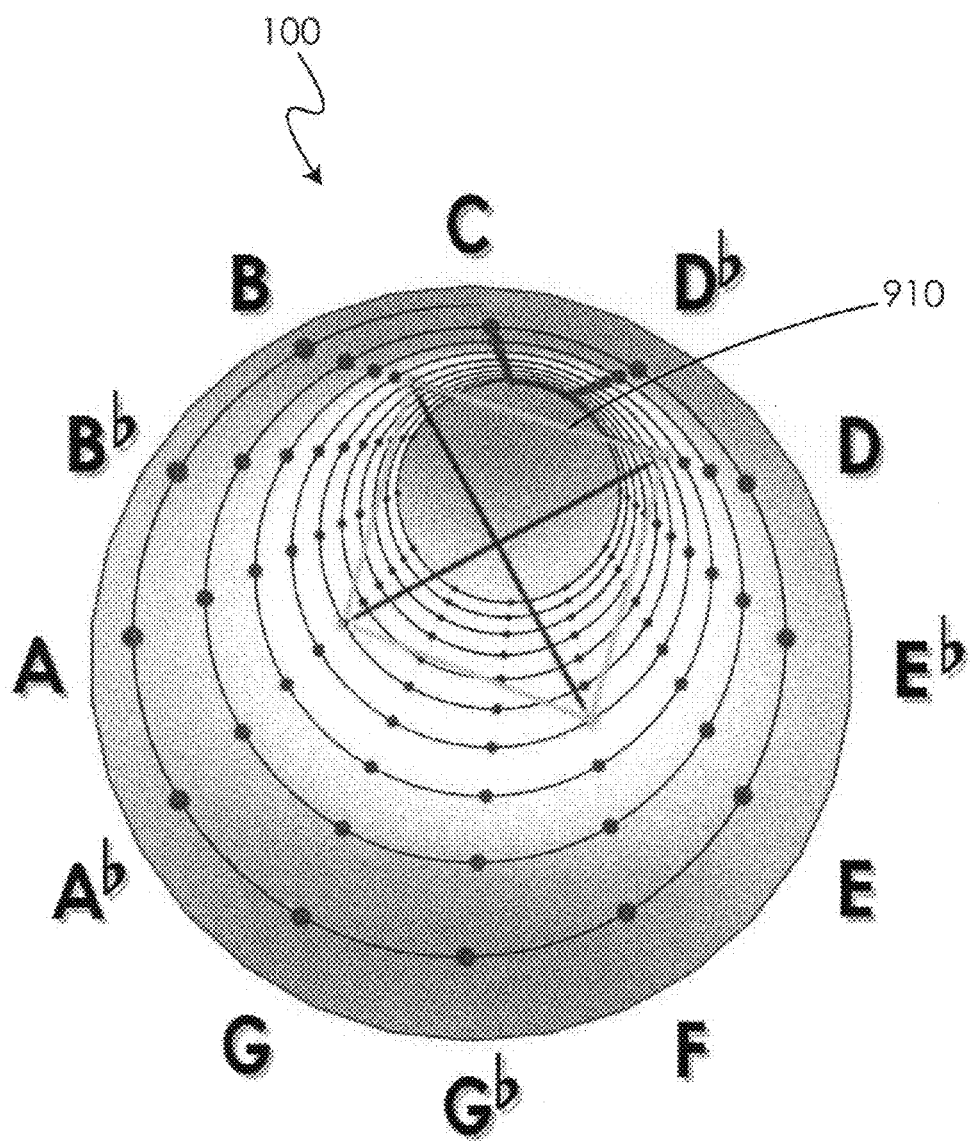

The previously described diagrams have been shown in two dimensions; however, music is not a circle as much as it is a helix. Every twelfth note (an octave) is one helix turn higher or lower than the preceding level. What this means is that music can be viewed not only as a circle but as something that will look very much like a DNA helix, specifically, a helix of approximately ten and one-half turns (i.e. octaves). There are only a small number of helix turns in the complete spectrum of audible sound; from the lowest auditory sound to the highest auditory sound. By using a helix instead of a circle, not only can the relative pitch difference between the notes be discerned, but the absolute pitch of the notes can be seen as well. For example, FIG. 9 shows a helix 100 about an axis 900 in a perspective view with a chord 910 (a fully diminished seventh chord in this case) placed within. In FIG. 10, the perspective has been changed to allow each octave point on consecutive turns of the helix to line up. This makes it possible to use a single set of labels around the helix. The user is then able to see that this is a B fully diminished seventh chord and discern which octave the chord resides in.

Figure 11:
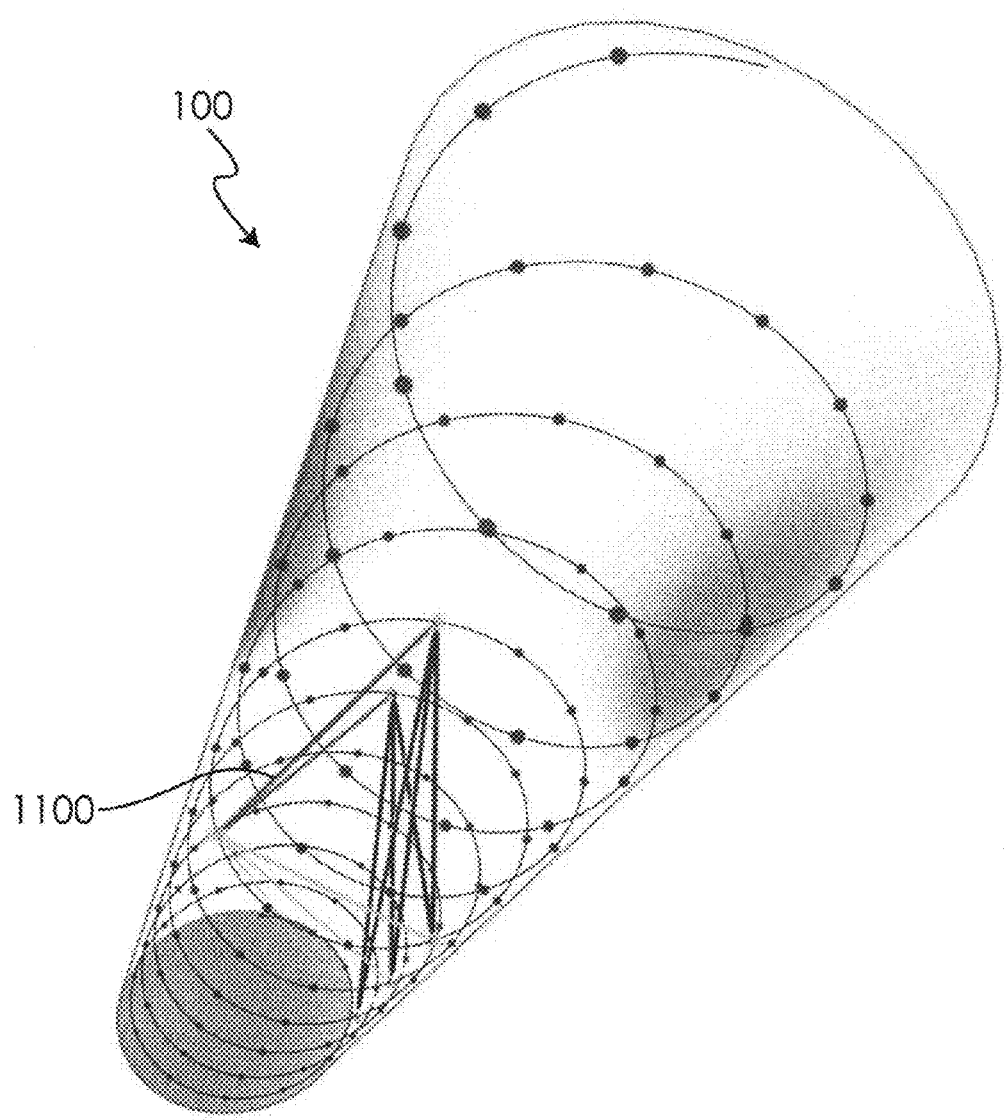
FIG. 11 is a diagram of a helix showing an F minor triad covering three octaves.

The use of the helix becomes even more powerful when a single chord is repeated over multiple octaves. For example, FIG. 11 shows how three F minor triad chords look when played together over three and one-half octaves. In two dimensions, the user will only see one triad, since all three of the triads perfectly overlap on the circle. In the three-dimensional helix, however, the extended scale is visible across all three octaves.

The above described MASTER KEY™ system provides a method for understanding the tonal information within musical compositions. Another method, however, is needed to deal with the rhythmic information, that is, the duration of each of the notes and relative time therebetween. Such rhythmic visualization methods are described in U.S. Utility patent application Ser. No. 12/023,375 filed Jan. 31, 2008 entitled "Device and Method for Visualizing Musical Rhythmic Structures" which is also hereby incorporated by reference in its entirety.

In addition to being flawed in relation to tonal expression, traditional sheet music also has shortcomings with regards to rhythmic information. This becomes especially problematic for percussion instruments that, while tuned to a general frequency range, primarily contribute to the rhythmic structure of music. For example, traditional staff notation 1250, as shown in the upper portion of FIG. 12, uses notes 1254 of basically the same shape (an oval) for all of the drums in a modern drum kit and a single shape 1256 (an 'x' shape) for all of the cymbals. What is needed is a method that more intuitively conveys the character of individual rhythmic instruments and the underlying rhythmic structures present in a given composition.

Figure 12:
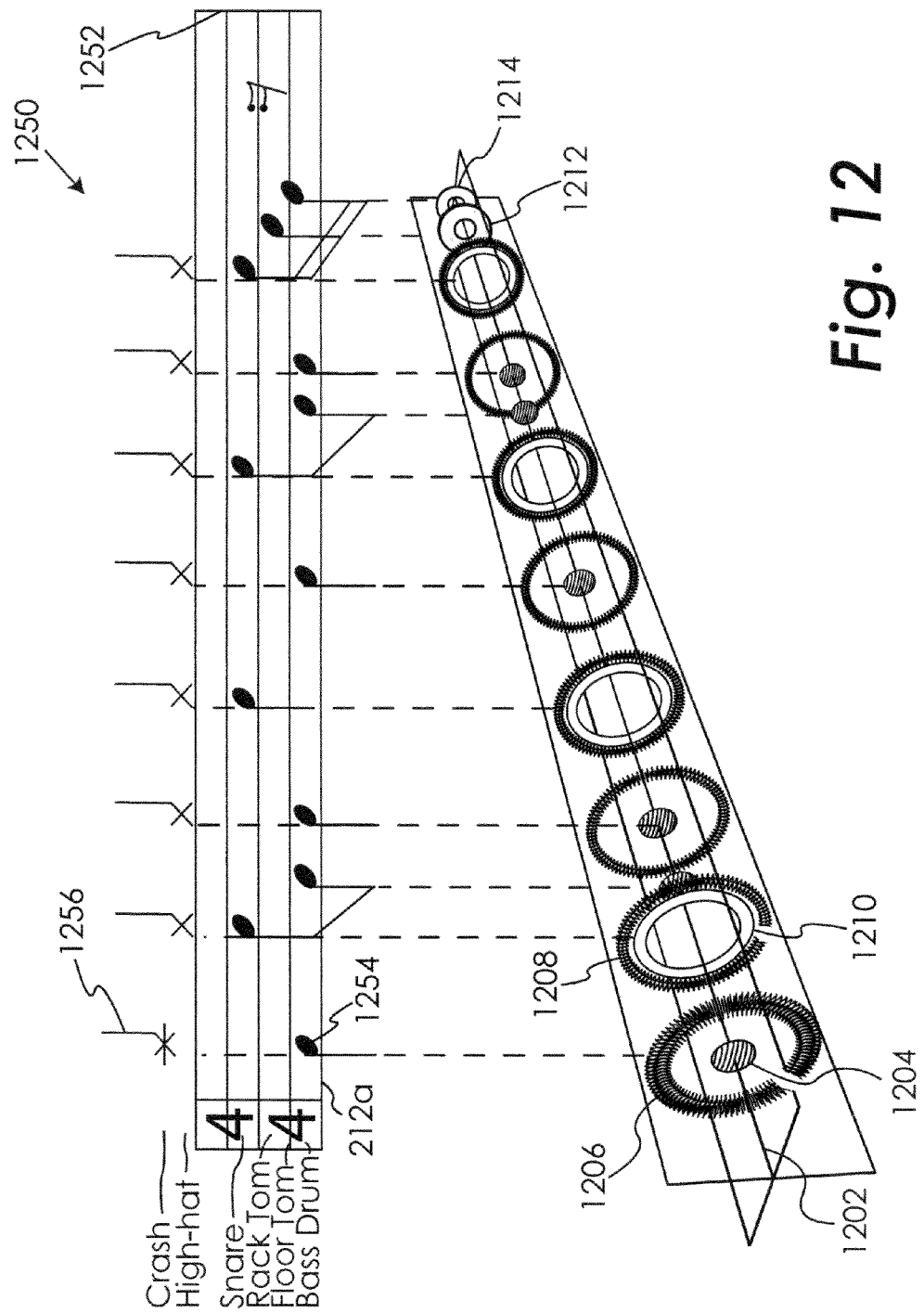
FIG. 12 is a perspective view of the visual representation of percussive music according to one embodiment shown with associated standard notation for the same percussive music.

The lower portion of FIG. 12 shows one embodiment of the disclosed method which utilizes spheroids 1204 and toroids 1206, 1208, 1210, 1212 and 1214 of various shapes and sizes in three dimensions placed along a time line 1202 to represent the various rhythmic components of a particular musical composition. The lowest frequencies or lowest instrument in the composition (i.e. the bass drum) will appear as spheroids 1204. As the rhythmical frequencies get higher in range, toroids 1206, 1208, 1210, 1212 and 1214 of various sizes are used to represent the sounded instrument. While the diameter and thicknesses of these spheroids and toroids may be adjustable components that are customizable by the user, the focus will primarily be on making the visualization as "crisply" precise as possible. In general, therefore, as the relative frequency of the sounded instrument increases, the maximum diameter of the spheroid or toroid used to depict the sounding of the instrument also increases. For example, the bass drum is represented by a small spheroid 1204, the floor tom by toroid 1212, the rack tom by toroid 1214, the snare by toroid 1210, the high-hat cymbal by toroid 1208, and the crash cymbal by toroid 1206. Those skilled in the art will recognize that other geometric shapes may be utilized to represent the sounds of the instruments within the scope of the disclosure.

Figure 13:
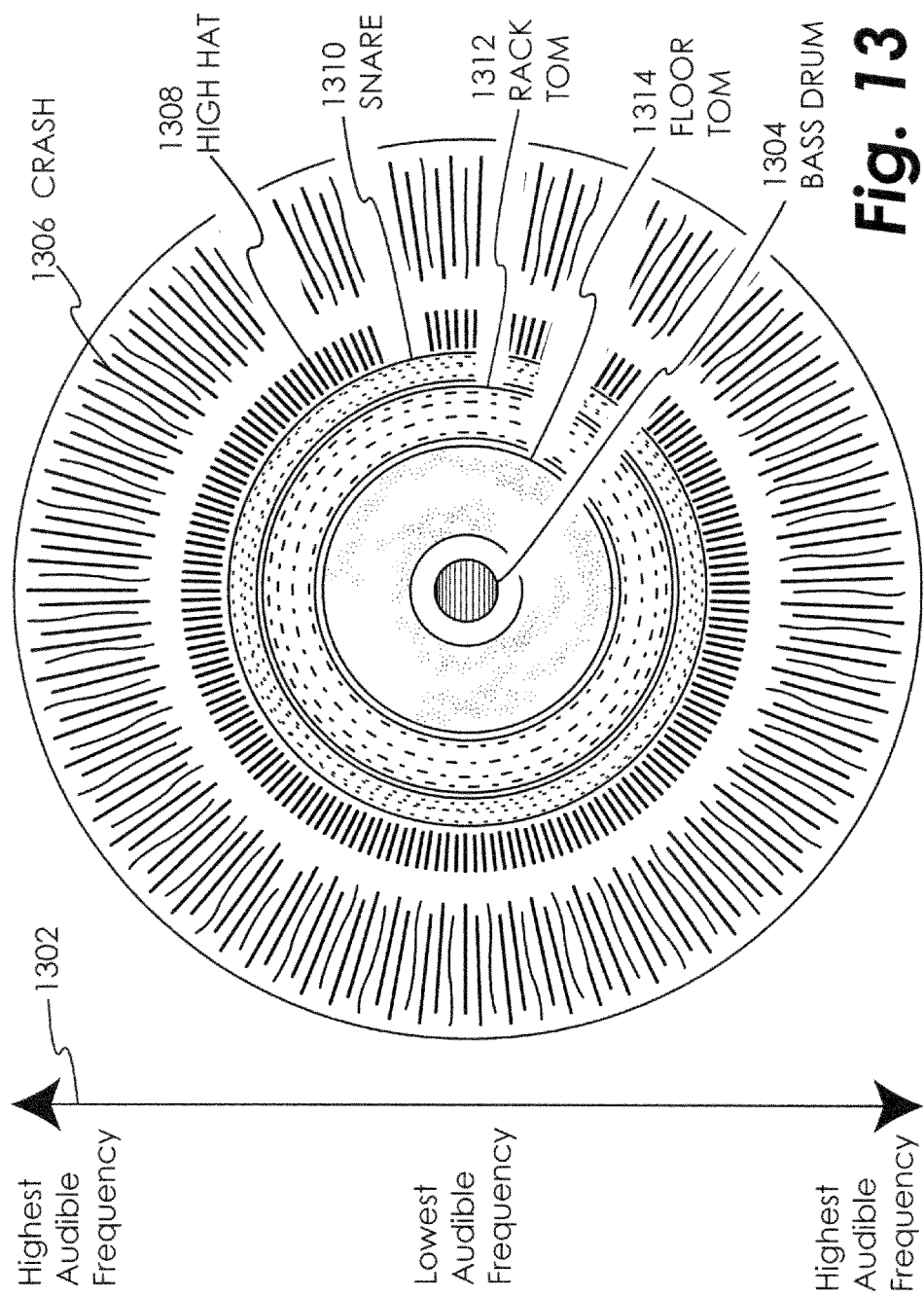
FIG. 13 is a two dimensional view looking along the time line of a visual representation of percussive music at an instant when six percussive instruments are being simultaneously sounded.

FIG. 13 shows another embodiment which utilizes a two-dimensional view looking into the time line 1202. In this embodiment, the spheroids 1204 and toroids 1206, 1208, 1210 and 1212 from FIG. 12 correspond to circles 1304 and rings 1306, 1308, 1310 and 1312, respectively. The lowest frequencies (i.e. the bass drum) will appear as a solid circle 1304 in a hard copy embodiment. Again, as the relative frequency of the sounded instrument increases, the maximum diameter of the circle or ring used to depict the sounding of the instrument also increases, as shown by the scale 1302.

Because cymbals have a higher auditory frequency than drums, cymbal toroids have a resultantly larger diameter than any of the drums. Furthermore, the amorphous sound of a cymbal will, as opposed to the crisp sound of a snare, be visualized as a ring of varying thickness, much like the rings of a planet or a moon. The "splash" of the cymbal can then be animated as a shimmering effect within this toroid. In one embodiment, the shimmering effect can be achieved by randomly varying the thickness of the toroid at different points over the circumference of the toroid during the time period in which the cymbal is being sounded as shown by toroid 1204 and ring 1306 in FIGS. 12 and 13, respectively. It shall be understood by those with skill in the art that other forms of image manipulation may be used to achieve this shimmer effect.

Figure 14:
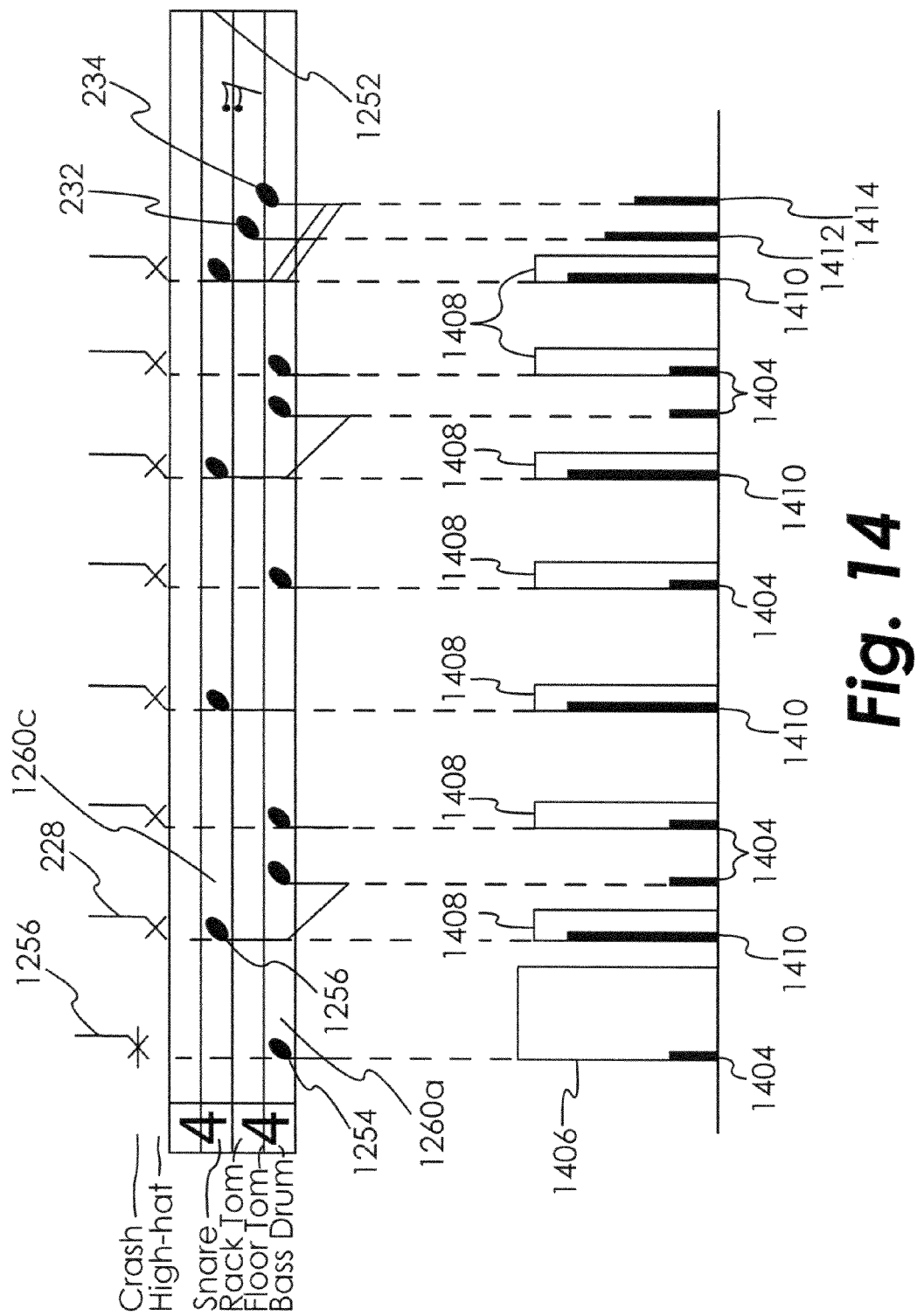
FIG. 14 is a two dimensional view looking perpendicular to the time line of the visual representation of percussive music according to the disclosure associated with standard notation for the same percussive music of FIG. 12.

FIG. 14 shows another embodiment which utilizes a two dimensional view taken perpendicular to the time line 1202. In this view, the previously seen circles, spheroids, rings or toroids turn into bars of various height and thickness. Spheroids 1204 and toroids 1206, 1208, 1210, 1212 and 1214 from FIG. 12 correspond to bars 1404, 1406, 1408, 1410, 1412, and 1414 in FIG. 14. For each instrument, its corresponding bar has a height that relates to the particular space or line in, above, or below the staff on which the musical notation for that instrument is transcribed in standard notation. Additionally, the thickness of the bar for each instrument corresponds with the duration or decay time of the sound played by that instrument. For example, bar 1406 is much wider than bar 1404, demonstrating the difference in duration when a bass drum and a crash cymbal are struck. To enhance the visual effect when multiple instruments are played simultaneously, certain bars may be filled in with color or left open.

The spatial layout of the two dimensional side view shown in FIG. 14 also corresponds to the time at which the instrument is sounded, similar to the manner in which music is displayed in standard notation (to some degree). Thus, the visual representation of rhythm generated by the disclosed system and method can be easily converted to sheet music in standard notation by substituting the various bars (and spaces therebetween) into their corresponding representations in standard notation. For example, bar 1404 (representing the bass drum) will be converted to a note 1254 in the lowest space 1260*a* of staff 1252. Likewise, bar 1410 (representing the snare drum) will be converted to a note 1256 in the second highest space 1260*c* of staff 1252.

The 3-D visualization of this Rhythmical Component as shown, for example, in FIG. 12, results in imagery that appears much like a 'wormhole' or tube. For each composition of music, a finite length tube is created by the system which represents all of the rhythmic structures and relationships within the composition. This finite tube may be displayed to the user in its entirety, much like traditional sheet music. For longer compositions, the tube may be presented to the user in sections to accommodate different size video display screens. To enhance the user's understanding of the particular piece of music, the 3-D 'wormhole' image may incorporate real time animation, creating the visual effect of the user traveling through the tube. In one embodiment, the rhythmic structures appear at the point "nearest" to the user as they occur in real time, and travel towards the "farthest" end of the tube, giving the effect of the user traveling backwards through the tube.

The two-dimensional view of FIG. 13 can also be modified to incorporate a perspective of the user looking straight "into" the three-dimensional tube or tunnel, with the graphical objects made to appear "right in front of" the user and then move away and into the tube, eventually shrinking into a distant center perspective point. It shall be understood that animation settings for any of the views in FIGS. 12-14 can be modified by the user in various embodiments, such as reversing the animation direction or the duration of decay for objects which appear and the fade into the background. This method of rhythm visualization may also incorporate the use of color to distinguish the different rhythmic structures within a composition of music, much like the MASTER KEY™ diagrams use color to distinguish between tonal intervals. For example, each instance of the bass drum being sounded can be represented by a sphere of a given color to help the user visually distinguish it when displayed among shapes representing other instruments.

In other embodiments, each spheroid (whether it appears as such or as a circle or line) and each toroid (whether it appears as such or as a ring, line or bar) representing a beat when displayed on the graphical user interface will have an associated small "flag" or access control button. By mouse-clicking on one of these access controls, or by click-dragging a group of controls, a user will be able to highlight and access a chosen beat or series of beats. With a similar attachment to the Master Key™ music visualization software (available from Musical DNA LLC, Indianapolis, Ind.), it will become very easy for a user to link chosen notes and musical chords with certain beats and create entire musical compositions without the need to write music using standard notation. This will allow access to advanced forms of musical composition and musical interaction for musical amateurs around the world.

The present disclosure utilizes the previously described visualization methods as the basis for a system of speech therapy and voice training. The easily visualized tonal and rhythmic shapes allow a person to "see" their sounds or words as they attempt to pronounce them correctly and clearly. The system can benefit people who are deaf, have lost the ability to speak clearly due to stroke or other illness, or who simply have trouble with proper pronunciation. In addition, the system can provide voice training assistance for students learning to sing. Being able to visually associate a particular chord or note combination with a particular shape and/or color greatly aids in the student's ability to determine whether they are singing a note or passage correctly, especially when a live instructor is not present.

Figure 15:
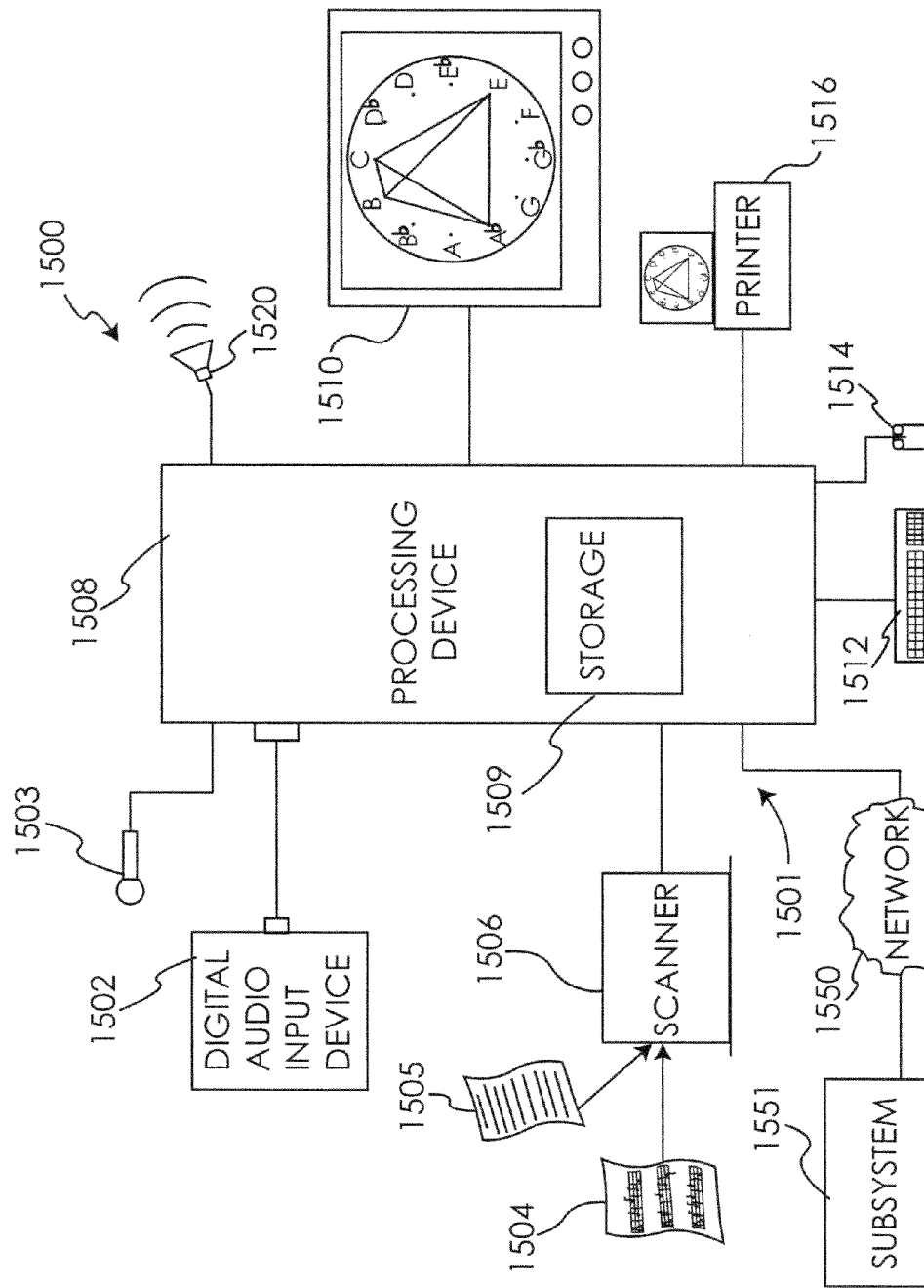
FIG. 15 is a schematic block diagram showing a speech processing system according to one embodiment.

FIG. 15, shows, in schematic form, one embodiment of a speech therapy system 1500 according to the present disclosure. The system 1500 may include a first subsystem 1501 including a digital audio input device 1502, a microphone 1503, a scanning device 1506 for inputting sheet music 1504 or written text 1505, a processing device 1508, data storage device 1509, a display 1510, user input devices such as keyboard 1512 and mouse 1514, a printer device 1516 and one or more speakers 1520. These devices are coupled to allow the input of a person's voice into the processing device 1508 so that their voice may be produced by the speaker 1520 and visual representations of their voice may be displayed, printed or manipulated by users. Digital audio input device 1502 and scanning device 1501 are also operatively coupled to processing device 1508 to provide reference input for the user in the form of audio signals or written text and sheet music.

The digital audio input device 1502 may include a digital music player such as an MP3 device or CD player, an analog music player, instrument or device with appropriate interface, transponder and analog-to-digital converter, or a digital music file, as well as other input devices and systems. The digital audio information may contain prerecorded voice or music recordings that can be visualized to serve as an example for the user when comparing visualizations of their own voice. In addition, digital audio input device 1502 may comprise an instrument, such as a piano, with a MIDI (Musical Instrument Digital Interface) interface which can be used as a reference sound or accompaniment when the system 1500 is implemented to teach singing.

The processing device 1508 may be implemented on a personal computer, a workstation computer, a laptop computer, a palmtop computer, a wireless terminal having computing capabilities (such as a cell phone having a Windows CE or Palm operating system), a game terminal, or the like. It will be apparent to those of ordinary skill in the art that other computer system architectures may also be employed.

In general, such a processing device 1508, when implemented using a computer, comprises a bus for communicating information, a processor coupled with the bus for processing information, a main memory coupled to the bus for storing information and instructions for the processor, a read-only memory coupled to the bus for storing static information and instructions for the processor. The display 1510 is coupled to the bus for displaying information for a computer user and the input devices 1512, 1514 are coupled to the bus for communicating information and command selections to the processor. A mass storage interface for communicating with data storage device 1509 containing digital information may also be included in processing device 1508 as well as a network interface for communicating with a network.

The processor may be any of a wide variety of general purpose processors or microprocessors such as the PENTIUM microprocessor manufactured by Intel Corporation, a POWER PC manufactured by IBM Corporation, a SPARC processor manufactured by Sun Corporation, or the like. It will be apparent to those of ordinary skill in the art, however, that other varieties of processors may also be used in a particular computer system. Display 1510 may be a liquid crystal device (LCD), a cathode ray tube (CRT), a plasma monitor, a holographic display, or other suitable display device. The mass storage interface may allow the processor access to the digital information in the data storage devices via the bus. The mass storage interface may be a universal serial bus (USB) interface, an integrated drive electronics (IDE) interface, a serial advanced technology attachment (SATA) interface or the like, coupled to the bus for transferring information and instructions. The data storage device 1509 may be a conventional hard disk drive, a floppy disk drive, a flash device (such as a jump drive or SD card), an optical drive such as a compact disc (CD) drive, digital versatile disc (DVD) drive, HD DVD drive, BLUE-RAY DVD drive, or another magnetic, solid state, or optical data storage device, along with the associated medium (a floppy disk, a CD-ROM, a DVD, etc.)

In general, the processor retrieves processing instructions and data from the data storage device 1509 using the mass storage interface and downloads this information into random access memory for execution. The processor then executes an instruction stream from random access memory or read-only memory. Command selections and information that is input at input devices 1512, 1514 are used to direct the flow of instructions executed by the processor. Equivalent input devices 1514 may also be a pointing device such as a conventional trackball device. The results of this processing execution are then displayed on display device 1510.

The processing device 1508 is configured to generate an output for viewing on the display 1510 and/or for driving the printer 1516 to print a hardcopy. Preferably, the video output to display 1510 is also a graphical user interface, allowing the user to interact with the displayed information.

The system 1500 may optionally include one or more subsystems 1551 substantially similar to subsystem 1501 and communicating with subsystem 1501 via a network 1550, such as a LAN, WAN or the internet. Subsystems 1501 and 1551 may be configured to act as a web server, a client or both and will preferably be browser enabled. Thus with system 1500, remote teaching is made possible when an instructor is not able to be physically present. System 1500 may also be configured to be portable so an individual can continue to practice and improve their speech or singing ability even after the sessions with a speech therapist or vocal instructor have ended, thereby avoiding the potential problem with stagnation or regression due to the lack of continuing instruction.

When system 1500 is utilized for speech therapy, microphone 1503 is operative to receive or pick up words or phrases spoken by a patient. Microphone 1503 creates signals representative of the spoken words or phrases and applies them to processor 1508. Processor 1508 creates tonal and/or rhythm visualization components from the microphone signals and displays them on display 1510. The actual spoken words, or the words as correctly spoken, may be provided via speaker 1520. The processing device 1508 may receive stored or archived visualization components, preferably in an encoded or digital format, from the data storage device 1509. Reference audio signals may also be retrieved from data storage device 1509 or digital audio input device 1502. The visualization components, whether in encoded or unencoded form, contain information relating to the particular words or phrase of interest, including pitch, timbre, and volume, as non-limiting examples.

The stored visualization components are easily retrievable for repeated display or a visual comparison to currently spoken words in order to provide a reference for the patient and gauge the progress of the patient over time. By viewing the specific characteristics of the tonal and rhythm visualization components, e.g., shapes and colors, of a spoken word as compared to the same word correctly spoken, a patient can immediately see the areas where their speech is deficient, e.g., certain vowels or consonants. The patient can then concentrate or focus on specific words or intonations until their speech improves in that area, such improvement being immediately visible on display 1510 to the patient and the speech therapist (if a therapist is involved). By being able to "see" their words, a speech therapy patient is likely to make much faster progress than a patient who only is able to hear what they or others are speaking. Deaf patients will particularly benefit from the disclosed visualization methods as opposed to learning to speak only by watching the position of someone else's lips and tongue. Because the visualization system described herein begins at the very root of speech, i.e. individual notes or sounds, a deaf person can also utilize the system 1500 at an early stage of speech development, e.g., merely making simple sounds correctly, through a complete training regimen in which they learn to speak clearly enough to be easily understood by others.

In a similar fashion, the system 1500 can be utilized to enhance vocal music instruction. Microphone 1503 senses the student's voice and provides representative signals to processing device 1508. Again, processing device 1508 creates visualizations of the student's voice for display on display 1510, with digital audio input device 1502 optionally providing additional signals for the student to use as a reference, such as background music or individual musical notes played by the student or an instructor, e.g. when digital audio input device 1502 is implemented as a MIDI piano keyboard. The visualization components contain information relating to the vocal material of interest, including pitch, timbre, and volume, as non-limiting examples. The visualization components as sung by a student or person learning to sing may be stored in data storage device 1509, or recorded on removable or portable media, as may the visualization components of the same material as properly sung by the instructor, or a professional singer, for example. These visualization components may be used to create a visual side-by-side comparison to aid the student in gauging his or her progress over time. By viewing the specific characteristics of the tonal and/or rhythm visualization components, e.g., shapes and colors, of a musical passage sung by a student, as compared to the same passage sung by an instructor or professional singer, a student can immediately see the areas where the vocal technique is deficient, e.g., maintaining correct pitch or controlling voice modulation. The visualization components allow the student to practice fundamentals, e.g., matching the pitch of a single note, as well as more complex techniques, e.g., singing or matching harmonies. The student can then focus on specific areas that require improvement, even when outside of the instructional environment, with any improvement being immediately visible on display device 1510. Again, by being able to "see" their vocalizing, a voice student will make much faster progress than a student who only is able to learn where they need improvement through the verbal feedback of an instructor.

In order to visualize the individual components of a person's voice, the system 1500 can implement software operating as an audio signal or note extractor. The audio extractor examines the voice signals received by the microphone 1503 and determines which frequencies are most important to the sounding of a given syllable or word. The frequency content is then mapped to certain colors within a tonal circle or helix and displayed to the user. Various audio frequency extraction methods are described in U.S. Patent Application Ser. No. 61/025,374 filed Feb. 1, 2008 entitled "Apparatus and Method for Visualization of Music Using Note Extraction" which is hereby incorporated by reference in its entirety.

Figure 16:
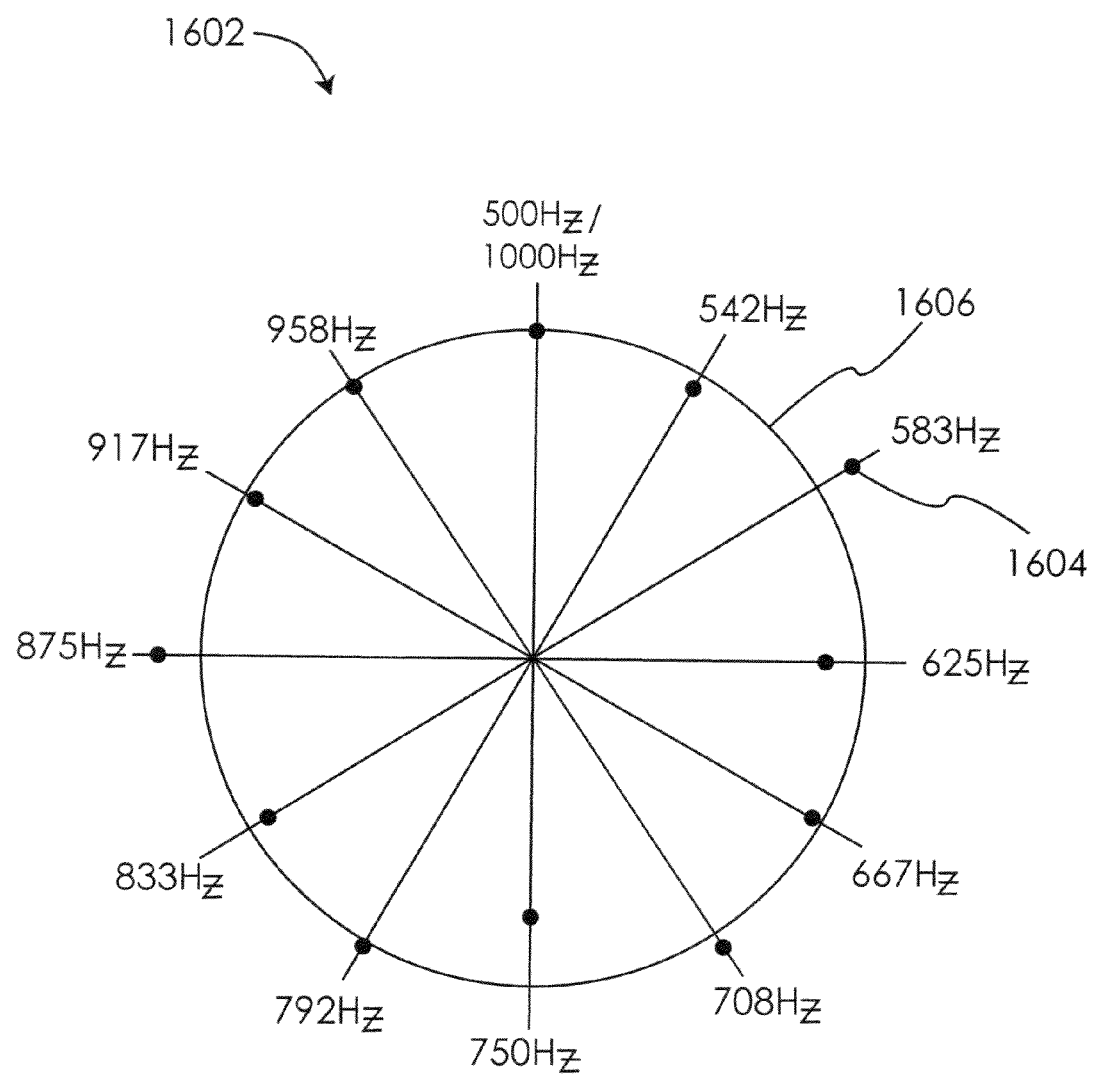
FIG. 16 depicts a visual representation of various frequency components of an individual's voice according to one embodiment.

It shall be understood that while the tonal circle and helix has been described above as having twelve subdivisions corresponding to twelve notes in a musical scale, a higher or lower number of subdivisions can be used to represent the complex nature of the human voice. This is particularly important when visualizing speech sounds or patterns. FIG. 16 depicts one embodiment where visualization 1602 is generated based on a patient's voice, with the circle 1606 divided into an equal number of frequency intervals within a desired ranged (in this case, 500 Hz to 1000 Hz). The radial position of each of the indicators 1604 corresponds to the relative amplitude of the patient's voice at that frequency. By observing that certain frequencies are more prevalent in certain spoken syllables, the patient can use the visualizations to correct their pronunciation. For example, if the patient is not producing an "S" sound with enough emphasis, one of the higher frequency components will be displayed closer to the center of circle 1606. Conversely, an over emphasized "B" sound will be displayed as a peak in a corresponding lower frequency. In addition to a single circle format, the visualization can be translated to helical form in order to display a multi-octave range of frequencies.

Figure 17:
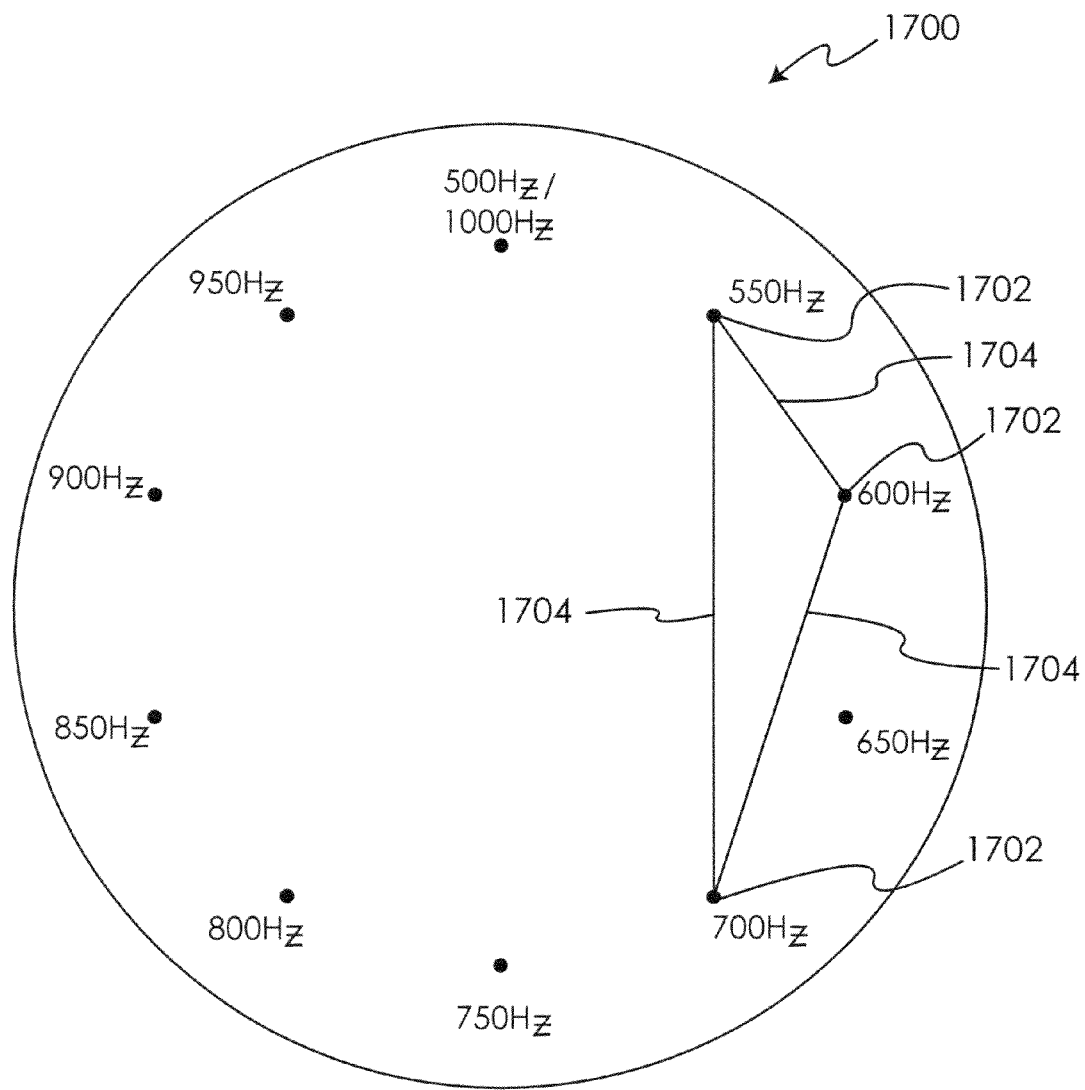
FIG. 17 depicts a visual representation of frequency components within a multi-syllable word as spoken by an individual according to one embodiment.
Figure 18:
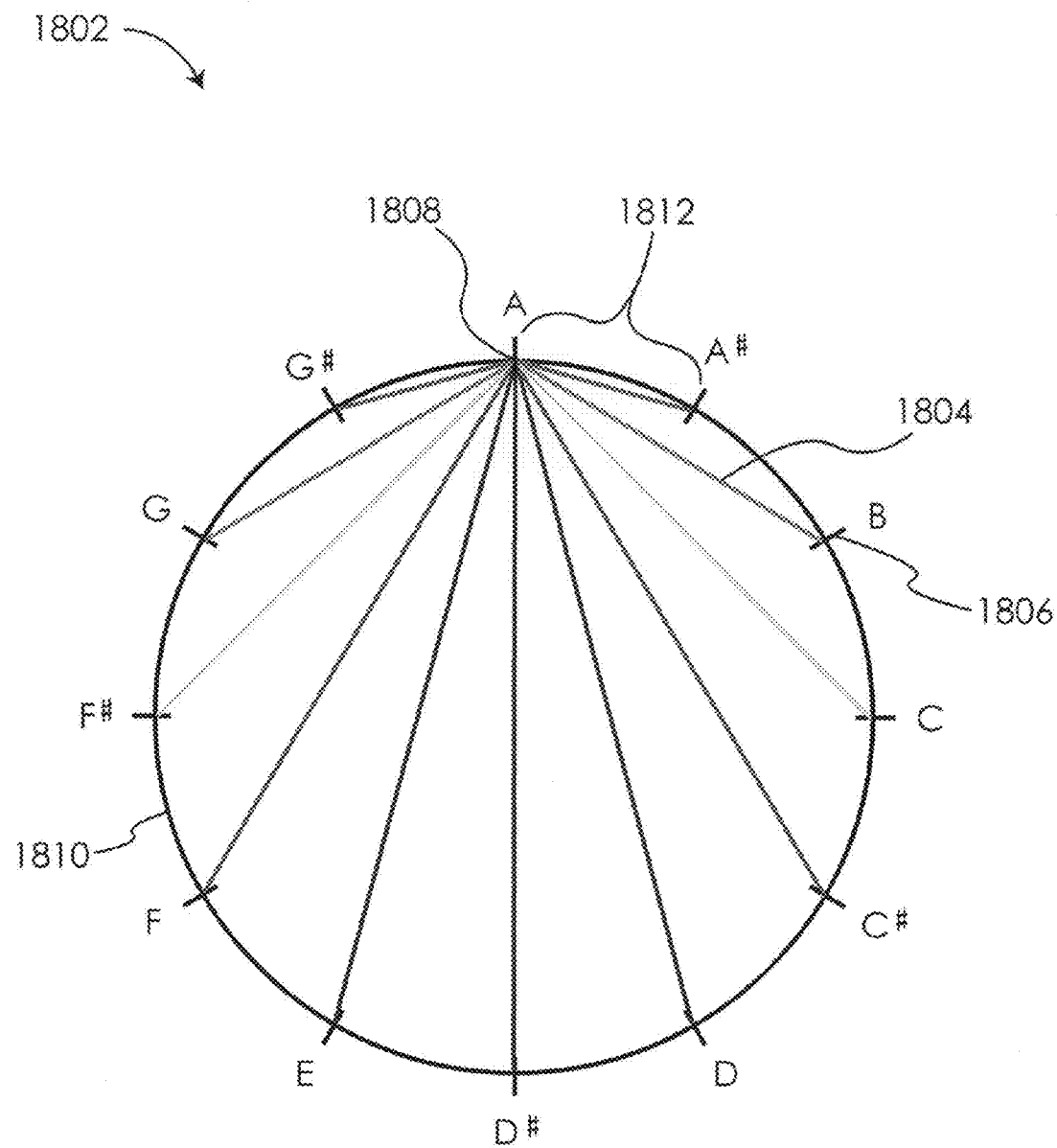
FIG. 18 is a color scheme for displaying a visual representation of a musical note as sung by a student according to one embodiment.

FIG. 17 shows an example of another visualization 1700 wherein lines 1704 connect points 1702 which represent the primary vocal frequency sensed for each syllable in a word. FIG. 17 displays the octave range from 500 Hz to 1000 Hz (one of the octaves within the human speech range), however it will be understood that any desired range can be used. The lines 1704 may also incorporate color as described hereinabove to further visualize the individual's vocal characteristics. In certain embodiments, the position and length of a line 1704 can represent pitch, with the color of the line 1704 representing the duration of time between tonal transitions. As another non-limiting example, the color of lines 1704 can correspond to the amplitude of each spoken syllable. In that way, particular vocal intonations, such as words spoken with an accent, can be identified in the encoded visualization signal information When used by a singing student, the twelve note circle or helix may be sufficient since the student will likely be trying to adhere to standard musical pitches. When the student sings a note, the system can display the note sang in relation to a desired reference note or frequency. FIG. 18 shows a visualization scheme 1802 according to one embodiment where the color of each line 1804 is dependent on the distance from the sensed note 1806 to a reference note 1808. The various color gradations correspond to different points or frequencies along the circle 1810. As illustrated in FIG. 18, the color of lines 1804 changes from red to orange to yellow to green to blue to purple as the interval between the sensed note 1806 and the reference note 1808 increases. It shall be understood that any desired color scheme may be used.

Figure 19:
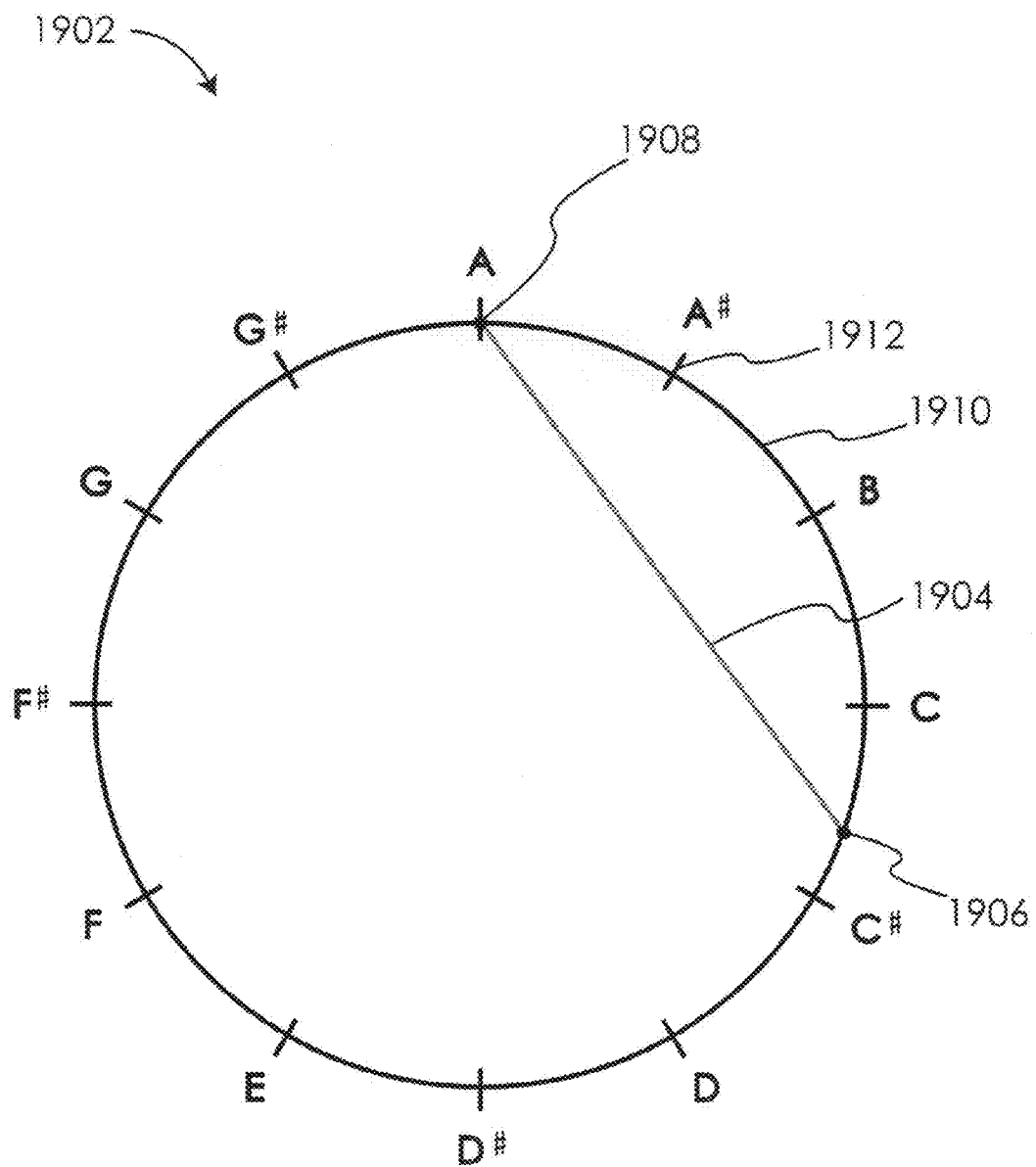
FIG. 19 depicts a visual representation of an individual note sung by a student according to the color scheme of FIG. 18, wherein the voiced frequency falls between a "C" and a "C#".

FIG. 19 shows one example where the desired note is an "A" and the student has sung a note falling somewhere between a "C" and a "C#," resulting in a yellowish-green line 1904 being displayed from sensed note indicator 1906 to the reference note 1908. For frequencies falling within the reference note and an immediately adjacent frequency subdivision, an additional repeating rainbow can be displayed within the interval (indicated as 1812 on FIG. 18) to provide more guidance for the student. This technique is described further in U.S. Provisional Patent Application Ser. No. 61/025/542 filed Feb. 1, 2008 entitled "Apparatus and Method of Displaying Infinitely Small Divisions of Measurement" which is herein incorporated by reference in its entirety.

In other embodiments, the visualization shown in FIG. 19 is used to represent the singing of two notes in succession (in this case, an "A" followed by a note somewhere between a "C" and a "C#"). It shall be understood that the system 1500 can be configured to lock the endpoints of the displayed line 1904 to the indicated subdivisions 1912 or allow them to "float" freely on the circle 1910 at the exact sensed frequency.

In addition to tonal frequency changes, the system 1500 can provide visualization of the rhythm components of a person's voice. Because the proper pronunciation of letters or words is often dependent on rhythm or cadence, these visualizations will help speech therapy patients understand whether they are correctly annunciating a particular word. For example, a "B" sound has a short attack time and a relatively longer release. This rhythm could be visualized as a small diameter spheroid, much like a bass drum as described hereinabove. On the other hand, an "S" sound is a more open ended sound which could be visualized much like a cymbal in the preceding examples.

The present disclosure contemplates that a speech therapy or vocal student may purchase voice instruction or lessons pre-programmed on electronic storage media, with or without printed materials. The program or software, accessed by processing device 1508 via data storage device 1509, for example, will then provide a step-by-step process for learning various words or vocal techniques using the previously described understandable tonal and rhythm visualization systems. The program or software will provide vocal visualization for the student, and the program can be configured to provide both the visualization of the word, note, musical passage, or rhythm pattern that the student was supposed to vocalize, as well as the word, note, passage, or pattern that was actually vocalized by the student. Through the use of this real-time visual feedback, a student can immediately determine both visually, and aurally, that a mistake was made. The correction that is required to be made in order to speak or sing the passage properly is also evident from the visualization system, either by merely viewing the correct visualization shape, color, or pattern, or by hints or specific instruction to the student.

The present disclosure also contemplates that system 1500 may incorporate a "shape filter," which will show a particular speech or musical shape using gray or dimly-lit lines. When the user speaks or sings sounds that match tones in the shape, the points and lines representing those tones will change color or become otherwise accentuated to provide further visual reinforcement to the user that the correct sounds are being vocalized. The system 1500 can also be configured to only output "correct" sounds. That is, sounds or notes vocalized by the user that are not part of the word or shape being taught will not be sounded or visually displayed. This prevents the user from being discouraged during the learning process and helps the user focus on the desired sounds.

The program or software can maintain statistics relating to the user's accuracy rate and provide rewards for improved performance. The student's accuracy can be measured both in terms of actual correct sounds in addition to timing accuracy. A metronome function can also be incorporated to help the student improve timing or rhythm accuracy. In certain embodiments, the system will keep track of which sounds or shapes the user has mastered so that the user can make more efficient use of practice time, concentrating on areas of difficulty. The program or software can also be configured to require a certain level of skill or mastery of a set of sounds or piece of music before allowing the student to continue to the next level or stage of instruction. The mastery level and statistical data for each user can be managed using unique user login information. When a user logs in, the system will be able to retrieve all of the data associated with that user. This will allow multiple users to utilize a single system as in a multi-use classroom environment or by accessing the software from an application service provider using the internet or other appropriate communications link. In addition, data storage device 1509 can be used to save the current training or performance session, along with all associated audio and visualization information, for later retrieval and analysis.

The instruction software or program can be configured to include a complete instructional regimen, or be sold as individual programs that require the purchase of successive modules as the student progressed in expertise. Sales of the instructional modules can be through stores, by on-line sales, or through direct downloads of software, and proof of prior accomplishment can be required to purchase the next module in an instructional series, if such control is desired.

Remote access to subsystem 1501 via network 1550 can provide help from an actual speech therapist or music instructor if a student needs additional help, or to demonstrate a level of accomplishment to enable advancement, for example. Access to an instructor may entail extra cost or a certain amount of instructor time may be included in the cost of the instruction programs or modules. Subsystem 1551, connected via network 1550, may also provide a source of instruction that can supplement or take the place of the previously described pre-programmed cards or modules, as well as a source of additional information, "extra credit" exercises or practice pieces, or the ability to purchase added components for system 1500 or other items. Downloads of the instructional software can also be available via subsystem 1551 and network 1550. In certain embodiments, a "virtual" therapist or instructor can be provided, such as computer generated voice, with or without a graphical human representation, which prompts the user through the various exercises The system 1500 can also be implemented as a video gaming system in which speech therapy or musical instruction can be combined with video games to provide additional interest and enjoyment to learning language or singing, through the use of the tonal and rhythm visualization systems, of course. Games and interactive exercises can be included in the previously described pre-programmed modules as well. The games can award points based on performance of certain words or musical scales, and allow users to collaborate and play against each other remotely over a network. The use of games in connection with the visualization systems can be especially interesting for younger students.

While the disclosure has been illustrated and described in detail in the drawings and foregoing description, the same is to be considered as illustrative and not restrictive in character, it being understood that only the preferred embodiments have been shown and described and that all changes, modifications and equivalents that come within the spirit of the disclosure provided herein are desired to be protected. The articles "a," "an," "said," and "the" are not limited to a singular element, and may include one or more such elements.

What is claimed:

1. A speech therapy system, comprising:
  a microphone;
  a processing device; and
  a display;
wherein:
  said processing device executes computer readable code to create a first visual representation of a spoken word sensed by said microphone for output on said display; and
wherein:
  said first visual representation is generated according to a method comprising the steps of:
  (a) labeling the perimeter of a circle with a plurality of labels corresponding to a plurality of equally spaced frequency intervals in an octave, such that moving clockwise or counter-clockwise between adjacent ones of said labels represents a first frequency interval;
  (b) identifying an occurrence of a first frequency within the spoken word;
  (c) identifying an occurrence of a second frequency within the spoken word;
  (d) identifying a first label corresponding to the first frequency;
  (e) identifying a second label corresponding to the second frequency;
  (f) creating a first line connecting the first label and the second label.

* * * * *